US012676670B2

(12) United States Patent
Lou

(10) Patent No.: US 12,676,670 B2
(45) Date of Patent: Jul. 7, 2026

(54) OPTICAL SIGNAL PROCESSING DEVICE AND OPTICAL SIGNAL MEASUREMENT METHOD

(71) Applicant: TECAT TECHNOLOGIES (SUZHOU) LIMITED, Suzhou Industrial Park Suzhou (CN)

(72) Inventor: Choon Leong Lou, Singapore (SG)

(73) Assignee: TECAT TECHNOLOGIES (SUZHOU) LIMITED, Suzhou Industrial Park Suzhou (CN)

( * ) Notice: Subject to any disclaimer, the term of this patent is extended or adjusted under 35 U.S.C. 154(b) by 490 days.

(21) Appl. No.: 18/470,000

(22) Filed: Sep. 19, 2023

(65) Prior Publication Data

US 2024/0430005 A1 Dec. 26, 2024

(30) Foreign Application Priority Data

Jun. 21, 2023 (CN) .......................... 202310744218.7

(51) Int. Cl.
*H04B 10/073* (2013.01)
*H04B 10/50* (2013.01)

(52) U.S. Cl.
CPC ....... *H04B 10/0731* (2013.01); *H04B 10/502* (2013.01)

(58) Field of Classification Search
CPC ... H04W 12/06; G01R 31/26; G01R 31/2635; H04B 10/502; H04B 10/0731; G01M 11/02; G01J 1/44; G01J 2001/446
See application file for complete search history.

(56) References Cited

U.S. PATENT DOCUMENTS

2019/0018057 A1* 1/2019 Pappas ................... G01R 31/26
2019/0172964 A1 6/2019 Hermes et al.

FOREIGN PATENT DOCUMENTS

| | | |
|---|---|---|
| CN | 101852674 A | 10/2010 |
| CN | 102540107 A | 7/2012 |
| CN | 102645276 A | 8/2012 |
| TW | 201743045 A | 12/2017 |
| TW | 201909300 A | 3/2019 |
| TW | 202135184 A | 9/2021 |
| WO | WO 2020/125840 A1 * | 6/2020 ............ H04W 12/06 |

OTHER PUBLICATIONS

Office Action dated Feb. 11, 2026 in chinese Application No. 202310744218.7; pp. 1-10.

* cited by examiner

*Primary Examiner* — Melissa J Koval
(74) *Attorney, Agent, or Firm* — MUNCY, GEISSLER, OLDS & LOWE, P.C.

(57) ABSTRACT

The present disclosure provides an optical signal processing device configured to measure wafer-scale micro LEDs, including optical signal testing units and an optical signal sensing device. The optical signal testing units are configured to transmit optical signals generated by micro LEDs. An optical signal testing unit transmits an optical signal generated by a micro LED. The optical signal sensing device is configured to sense the optical signals transmitted by the optical signal testing units during a plurality of time periods, and is configured to generate sensing signals according to the optical signals.

20 Claims, 13 Drawing Sheets

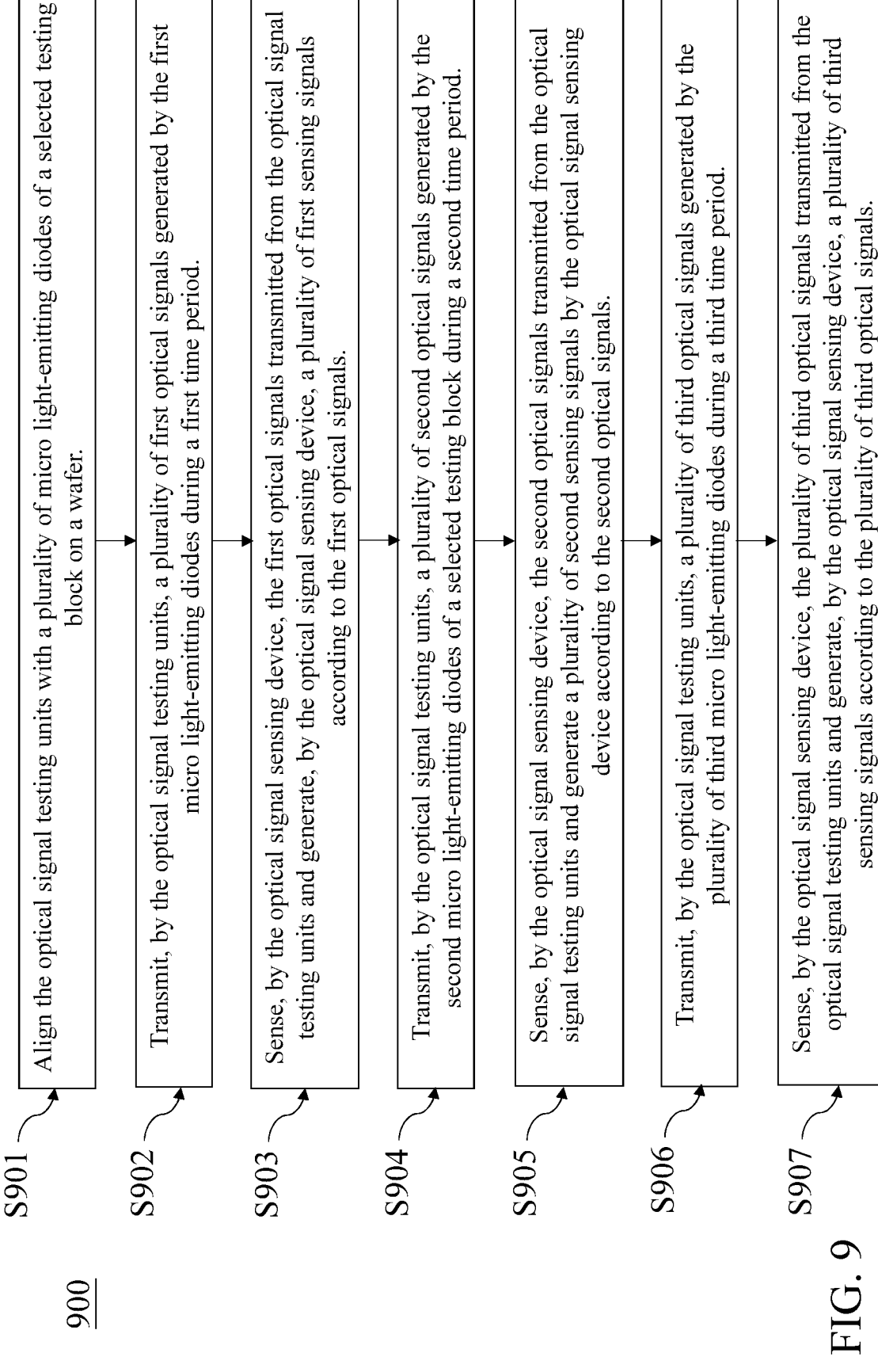

900

S901 — Align the optical signal testing units with a plurality of micro light-emitting diodes of a selected testing block on a wafer.

S902 — Transmit, by the optical signal testing units, a plurality of first optical signals generated by the first micro light-emitting diodes during a first time period.

S903 — Sense, by the optical signal sensing device, the first optical signals transmitted from the optical signal testing units and generate, by the optical signal sensing device, a plurality of first sensing signals according to the first optical signals.

S904 — Transmit, by the optical signal testing units, a plurality of second optical signals generated by the second micro light-emitting diodes of a selected testing block during a second time period.

S905 — Sense, by the optical signal sensing device, the second optical signals transmitted from the optical signal testing units and generate a plurality of second sensing signals by the optical signal sensing device according to the second optical signals.

S906 — Transmit, by the optical signal testing units, a plurality of third optical signals generated by the plurality of third micro light-emitting diodes during a third time period.

S907 — Sense, by the optical signal sensing device, the plurality of third optical signals transmitted from the optical signal testing units and generate, by the optical signal sensing device, a plurality of third sensing signals according to the plurality of third optical signals.

FIG. 9

OPTICAL SIGNAL PROCESSING DEVICE AND OPTICAL SIGNAL MEASUREMENT METHOD

FIELD OF THE PRESENT DISCLOSURE

The present disclosure relates to optical signal processing devices, and more particularly to an optical signal processing device capable of sensing optical signals generated by a light-emitting device.

DESCRIPTION OF THE PRIOR ART

The desirable dimensions of light-emitting devices are decreasing, but the required number of light-emitting devices in unit area is increasing. All the finished products of light-emitting devices have to undergo a test prior to delivery. Therefore, it is important to efficiently test the light-emitting devices which are increasingly numerous and increasingly densely distributed.

The above description of the "prior art" merely serves to reveal background technology but is not intended to acknowledge that the above description of the "prior art" discloses the subject matters of the disclosure, constitutes the prior art of the disclosure, or is part of the disclosure.

SUMMARY OF THE PRESENT DISCLOSURE

An aspect of the present disclosure provides an optical signal processing device, for testing optical signals of a micro light-emitting diode array, the micro light-emitting diode array being divided into a plurality of testing blocks each comprising a plurality of micro light-emitting diodes, the optical signal processing device testing the testing blocks one by one. The optical signal processing device includes a plurality of optical signal testing units and an optical signal sensing device. The optical signal testing units are configured for: transmitting a plurality of first optical signals, wherein the first optical signals are generated by a plurality of first micro light-emitting diodes of a selected testing block of the plurality of testing blocks during a first time period, and transmitting a plurality of second optical signals, wherein the second optical signals are generated by a plurality of second micro light-emitting diodes of the selected testing block during a second time period. The optical signal sensing device is configured for: sensing the first optical signals transmitted from the optical signal testing units during the first time period; sensing the second optical signals transmitted from the optical signal testing units during the second time period; and generating a plurality of sensing signals according to the first optical signals and the second optical signals. The first micro light-emitting diodes and the second micro light-emitting diodes correspond in position to the optical signal testing units, respectively, and each of the optical signal testing units transmits an optical signal generated by the corresponding micro light-emitting diode, the micro light-emitting diodes being in a one-to-one relation with the optical signal testing units. The first micro light-emitting diodes alternate with the second micro light-emitting diodes. A position of the optical signal testing units remains unchanged during the first time period and the second time period.

Another aspect of the present disclosure provides an optical signal measurement method for an optical signal processing device, the optical signal measurement method being adapted to test optical signals of a micro light-emitting diode array, the micro light-emitting diode array being divided into a plurality of testing blocks each comprising a plurality of micro light-emitting diodes, allowing the optical signal processing device to test the testing blocks one by one, with the optical signal processing device comprising a plurality of optical signal testing units and an optical signal sensing device. The optical signal measurement method includes: aligning the optical signal testing units with the plurality of micro light-emitting diodes of a selected testing block of the plurality of testing blocks on a wafer, wherein the micro light-emitting diodes comprise a plurality of first micro light-emitting diodes and a plurality of second micro light-emitting diodes; transmitting, by the optical signal testing units, a plurality of first optical signals generated by the first micro light-emitting diodes during a first time period, wherein each of the optical signal testing units transmits the first optical signal generated by a corresponding one of the first micro light-emitting diodes; sensing, by the optical signal sensing device, the first optical signals transmitted from the optical signal testing units and generating, by the optical signal sensing device, a plurality of first sensing signals according to the first optical signals; transmitting, by the optical signal testing units, a plurality of second optical signals generated by the second micro light-emitting diodes during a second time period, wherein each of the optical signal testing units transmits the second optical signal generated by a corresponding one of the second micro light-emitting diodes; and sensing, by the optical signal sensing device, the second optical signals transmitted from the optical signal testing units and generating a plurality of second sensing signals by the optical signal sensing device according to the second optical signals. The first micro light-emitting diodes and the second micro light-emitting diodes correspond in position to the optical signal testing units, respectively, and each of the optical signal testing units transmits an optical signal generated by the corresponding micro light-emitting diode, the micro light-emitting diodes being in a one-to-one relation with the optical signal testing units. The first micro light-emitting diodes alternate with the second micro light-emitting diodes. A position of the optical signal testing units remains unchanged during the first time period and the second time period.

The above description extensively explains the technical features and advantages of the disclosure to render the description below comprehensible. The other advantages and technical features which define the claims of the disclosure are described below. Persons skilled in the art understand that objectives identical to the ones of the disclosure can be easily achieved by changing or designing the other structures or processes in accordance with concepts and specific embodiments disclosed hereunder. Persons skilled in the art also understand that the aforesaid equivalent construction cannot depart from the spirit and scope of the appended claims of the disclosure.

BRIEF DESCRIPTION OF THE DRAWINGS

Persons skilled in the art can gain insight into the disclosure by referring to the embodiments, claims and drawings of the disclosure. In the drawings, like components are denoted by like reference numerals.

FIG. 9 is a flow chart of a measurement method in some embodiments of the disclosure.

DETAILED DESCRIPTION OF THE EMBODIMENTS

Figure 1:
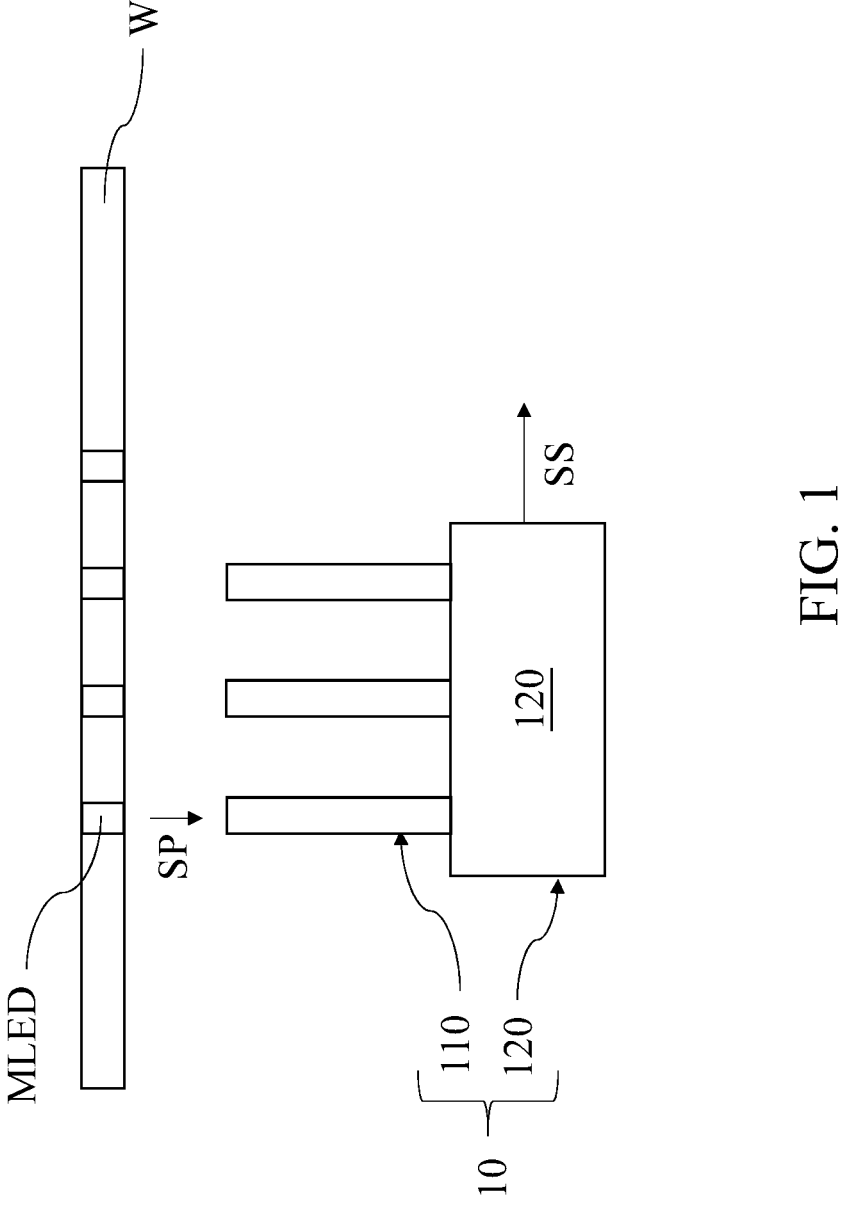
FIG. 1 is a schematic view of an optical signal processing device in some embodiments of the disclosure.

The description below is accompanied by and incorporated into some of the drawings to illustrate the embodiments of the disclosure. However, the disclosure is not limited to the embodiments. The embodiments described below may be appropriately integrated to attain any other embodiments.

The expressions "an embodiment," "embodiment," "exemplary embodiment," "other embodiments" and "another embodiment" apply to the situations where the embodiments of the disclosure include specific features, structures or characteristics, but not every embodiment must include the specific features, structures or characteristics. Furthermore, the repeated use of the expression "in the embodiment" may, but not necessarily, indicate the same embodiment.

To render the disclosure fully comprehensible, the description below provides steps and structures in detail. Obviously, the implementation of the disclosure will not place limitations on specific details well known among persons skilled in the art. Well-known structures and steps are not described in detail herein in order not to unnecessarily place limitations on the disclosure. Preferred embodiments of the disclosure are described below. However, in addition to being described in detail herein, the disclosure is widely applied to any other embodiments. The scope of the disclosure is not limited to the description below but is defined by the appended claims.

The description below provides different embodiments or examples for use in implementing different features of the disclosure. Specific embodiments or examples of components and arrangements are described in detail herein to simplify the contents of the disclosure. The specific embodiments and examples are illustrative rather than restrictive of the disclosure. For instance, dimensions of components are not restricted to disclosed ranges or values but are based on process criteria and/or expected nature of devices. In the description below, an embodiment of forming a first feature "on" or "above" a second feature includes any embodiments in which the first and second features thus formed are in direct contact with each other or includes any embodiments in which an additional feature is formed between the first feature and the second feature, allowing the first and second features to be not in direct contact with each other. For the sake of conciseness and clarity, the accompanying drawings are not drawn to scale. For the sake of conciseness, some layers/features are omitted from the accompanying drawings.

To facilitate illustration, spatial relation terms, such as "beneath," "below," "lower," "above," "upper," and the like, are used hereunder to describe the position of a component or feature relative to another component (other components) or another feature (other features) in the accompanying drawings. In addition to directions depicted in the accompanying drawings, the spatial relation terms are intended to indicate any other directions in which devices are used or operated. The devices can be positioned in any other directions (rotated by 90 degrees or the like), and the spatial relation terms used hereunder can still be interpreted accordingly.

Referring to FIG. 1, there is shown a schematic view of an optical signal processing device 10 in some embodiments of the disclosure. The optical signal processing device 10 measures multiple optical signals SP generated by multiple micro light-emitting diodes MLED during a time period.

The optical signal processing device 10 comprises multiple optical signal testing units 110 and an optical signal sensing device 120. The optical signal testing units 110 receive the optical signals SP generated by the micro light-emitting diodes MLED, respectively, and transmit the optical signals SP to the optical signal sensing device 120. In some embodiments, the optical signal testing units 110 are in a one-to-one relation with the micro light-emitting diodes MLED. Thus, the optical signal testing units 110 receive and transmit the optical signals SP generated by the micro light-emitting diodes MLED, respectively, and the optical signal testing units 110 are in a one-to-one relation with the micro light-emitting diodes MLED.

The optical signal sensing device 120 is coupled to the optical signal testing units 110, configured to sense the optical signals SP transmitted from the optical signal testing units 110, and configured to generate a plurality of sensing signals SS according to the optical signals SP. Therefore, the sensing signals SS can be analyzed with a backend analysis device (not shown) to obtain a related testing result.

In some embodiments, the micro light-emitting diodes MLED are wafer-scale micro light-emitting diodes (wafer-scale micro LEDs) disposed on a wafer W. Thus, the optical signal processing device 10 directly performs an optical signal measurement process on the micro light-emitting diodes MLED on the wafer W; however, the disclosure is not limited thereto. For example, in a variant embodiment, the micro light-emitting diodes MLED are any other devices capable of emitting optical signals.

In some other embodiments, the micro light-emitting diodes MLED are RGB light-emitting diodes. In this embodiment, the optical signal testing units 110 receive RGB optical signals SP generated by the multiple micro light-emitting diodes MLED during a time period, respectively. The optical signals SP can be optical signals in one of the RGB colors, such as red optical signals, green optical signals or blue optical signals.

Figure 2:
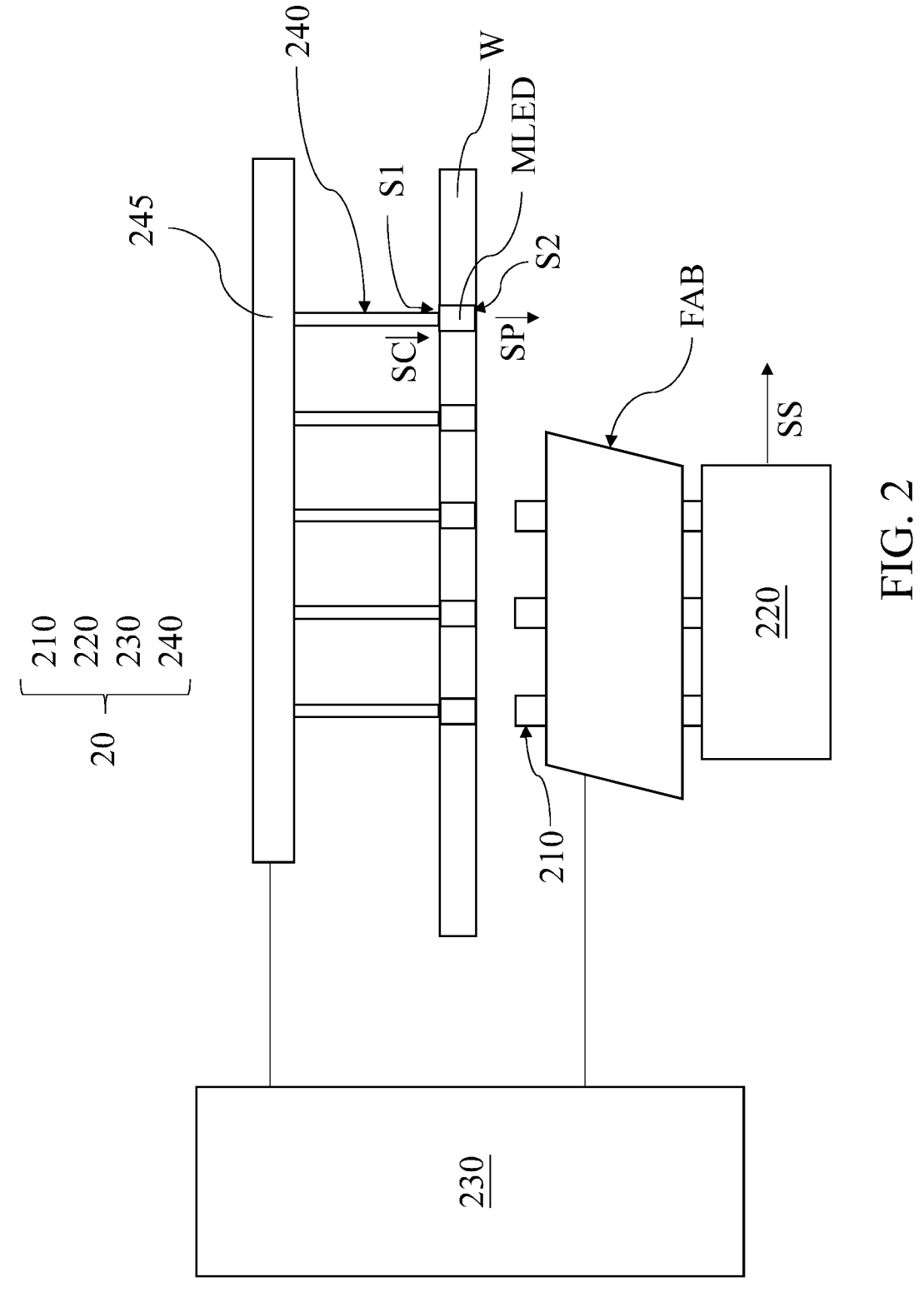
FIG. 2 is a schematic view of an optical signal processing device in some embodiments of the disclosure.

Referring to FIG. 2, there is shown a schematic view of an optical signal processing device 20 in some embodiments of the disclosure. The optical signal processing device 20 measures the multiple optical signals SP generated by the multiple micro light-emitting diodes MLED during a time period.

The optical signal processing device 20 includes multiple optical signal testing units 210, an optical signal sensing device 220, an alignment device 230 and multiple probes 240. Each probe 240 transmits a control signal SC to one corresponding micro light-emitting diode MLED, and thus the micro light-emitting diode MLED generates one optical signal SP according to the control signal SC. The probes 240 are in contact with the micro light-emitting diodes MLED and transmit the control signals SC to turn on the micro light-emitting diodes MLED, causing the micro light-emitting diodes MLED to generate the optical signals SP.

In some embodiments, the probes 240 are disposed on a probe card 245. The positions of the probes 240 are adjusted with the probe card 245 to allow the probes 240 to contact the micro light-emitting diodes MLED, respectively; however, the disclosure is not limited thereto. In a variant embodiment, various mechanisms or assemblies for providing the probes 240 fall within the scope of the disclosure.

In some embodiments, the optical signal testing units 210 each includes an optical guide unit for receiving the optical signal SP generated by a corresponding micro light-emitting diode MLED and transmitting the optical signal SP to the optical signal sensing device 220. In some embodiments, the optical guide units are optical fibers, and the optical signal testing units 210 together form a fiber array block (FAB). In some embodiments, the optical signal processing device 20 includes at least 48, 240, 480 or 960 optical signal testing units 210.

In some embodiments, the micro light-emitting diodes MLED are disposed on a wafer W and thus are wafer-scale micro light-emitting diodes. Therefore, the optical signal processing device 20 directly performs an optical signal measurement process on the micro light-emitting diodes MLED on the wafer W; however, the disclosure is not limited thereto. For example, in a variant embodiment, the micro light-emitting diodes MLED are any other devices capable of emitting optical signals, and the optical signal processing device 20 measures non-wafer-scale micro light-emitting diodes MLED.

In some other embodiments, the micro light-emitting diodes MLED are RGB light-emitting diodes. In this embodiment, the optical signal testing units 210 receive the RGB optical signals SP generated by the multiple micro light-emitting diodes MLED during a time period, respectively. The optical signals SP can be optical signals in one of the RGB colors, such as red optical signals, green optical signals or blue optical signals.

It is noteworthy that light emitted by micro light-emitting diodes MLED is received through integrating spheres and then measured, according to prior art. However, the size of the integrating spheres is much larger than the size of the micro light-emitting diodes, it is difficult to arrange multiple integrating spheres for the purpose of carrying out a measurement process. Furthermore, during the measurement process, the integrating spheres are subjected to a limitation in terms of the extent of the reception of light. As a result, the integrating spheres cannot receive all the optical signals, nor can the integrating spheres necessarily transmit every received optical signal to a measurement instrument, leading to transmission loss and resultant errors inevitably. Moreover, the number of micro light-emitting diodes that can be handled with the integrating spheres in one single instance is undesirably small (for example, 4, 8, 16, 32 micro light-emitting diodes), and only one micro light-emitting diode can be turned on and measured at once; as a result, it takes much time to measure a large number of micro light-emitting diodes.

Therefore, compared to the prior art, the optical signal testing units 210 of the present disclosure are compact and thus can function well even in case of space insufficiency. Therefore, the optical signal testing units 210 are in a one-to-one relation with the micro light-emitting diodes, greatly increasing the number of the micro light-emitting diodes that can be handled with the optical signal testing units 210 in one single instance of measurement. Furthermore, with the optical signal testing units 210 being in a one-to-one relation with the micro light-emitting diodes, multiple micro light-emitting diodes can be simultaneously turned on for the purpose of carrying out a measurement process. Thus, multiple optical signals SP simultaneously generated by multiple micro light-emitting diodes MLED are transmitted by the optical signal testing units 210 to greatly speed up the measurement process. The optical signal testing units 210 are optical fibers and thus can transmit the received optical signals SP to the optical signal sensing device 220 with minimal transmission loss to enhance measurement quality and reduce measurement errors.

For instance, if eight micro light-emitting diodes MLED are handled with the conventional integrating spheres, taking n seconds to test one micro light-emitting diode MLED turned on, and taking m seconds for the integrating spheres to undergo one instance of movement, then testing 24000 micro light-emitting diodes will substantially take 24000\*n+ (24000/8)\*m seconds, i.e., 24000\*n+3000\*m seconds. According to the disclosure, if the optical signal testing units 210 of the optical signal processing device 20 are in the number of 240, taking n seconds to test one micro light-emitting diode MLED turned on, and taking m seconds for all the optical signal testing units 210 to undergo one instance of movement, then testing 24000 micro light-emitting diodes MLED will substantially take (24000/240) \*n+(24000/240)\*m seconds, i.e., 100\*n+100\*m seconds. Obviously, the disclosure reduces the testing time effectively and greatly.

In some embodiments, one micro light-emitting diode MLED includes pixels of RGB light-emitting diodes and is disposed on a display panel (not shown). Thus, the optical signal processing device 20 performs an optical signal measurement process on the pixels on the display panel.

The optical signal sensing device 220 is coupled to the optical signal testing units 210 to sense the optical signals SP transmitted from the optical signal testing units 210 and generate a plurality of sensing signals SS according to the optical signals SP. In some embodiments, the optical signal sensing device 220 includes a camera for capturing an image formed from the optical signals SP on an imaging surface in the camera and then generating the sensing signals SS according to the image. In some embodiments, the optical signal sensing device 220 includes a CMOS image sensor (CIS) to sense the optical signals SP with photodiodes on the CIS and generate the sensing signals SS accordingly.

In some embodiments, the sensing signals SS are transmitted to an analysis instrument (not shown) and each indicate the performance of one micro light-emitting diode MLED. For example, the analysis instrument analyzes the brightness, chromatic aberration and the like of the micro light-emitting diodes MLED as indicated by the sensing signals SS. Upon confirmation of the brightness and/or chromatic aberration of all the micro light-emitting diodes MLED, all the micro light-emitting diodes MLED undergo binning according to the brightness and/or chromatic aberration, allocating the micro light-emitting diodes MLED with similar brightness and/or chromatic aberration to the same bin.

In some embodiments, the alignment device 230 aligns the probes 240 and the optical guide units of the optical signal testing units 210 with two different surfaces of the micro light-emitting diodes MLED, respectively. As shown in FIG. 2, the first surfaces S1 of the micro light-emitting diodes MLED are in contact with the probes 240 so as for the micro light-emitting diodes MLED to receive the control signals SC, and the micro light-emitting diodes MLED send the optical signals SP via the second surfaces S2 to the optical guide units of the optical signal testing units 210, with the first surface S1 and second surface S2 opposite to each other. In some embodiments, the alignment device 230 aligns the probes 240 (or the probe card 245) and the optical guide units of the optical signal testing units 210 with the micro light-emitting diodes MLED, respectively. For example, the alignment device 230 solely controls the probes 240 to contact the micro light-emitting diodes MLED or solely controls the optical guide units of the optical signal testing units 210 to align with the micro light-emitting diodes MLED.

Figure 3:
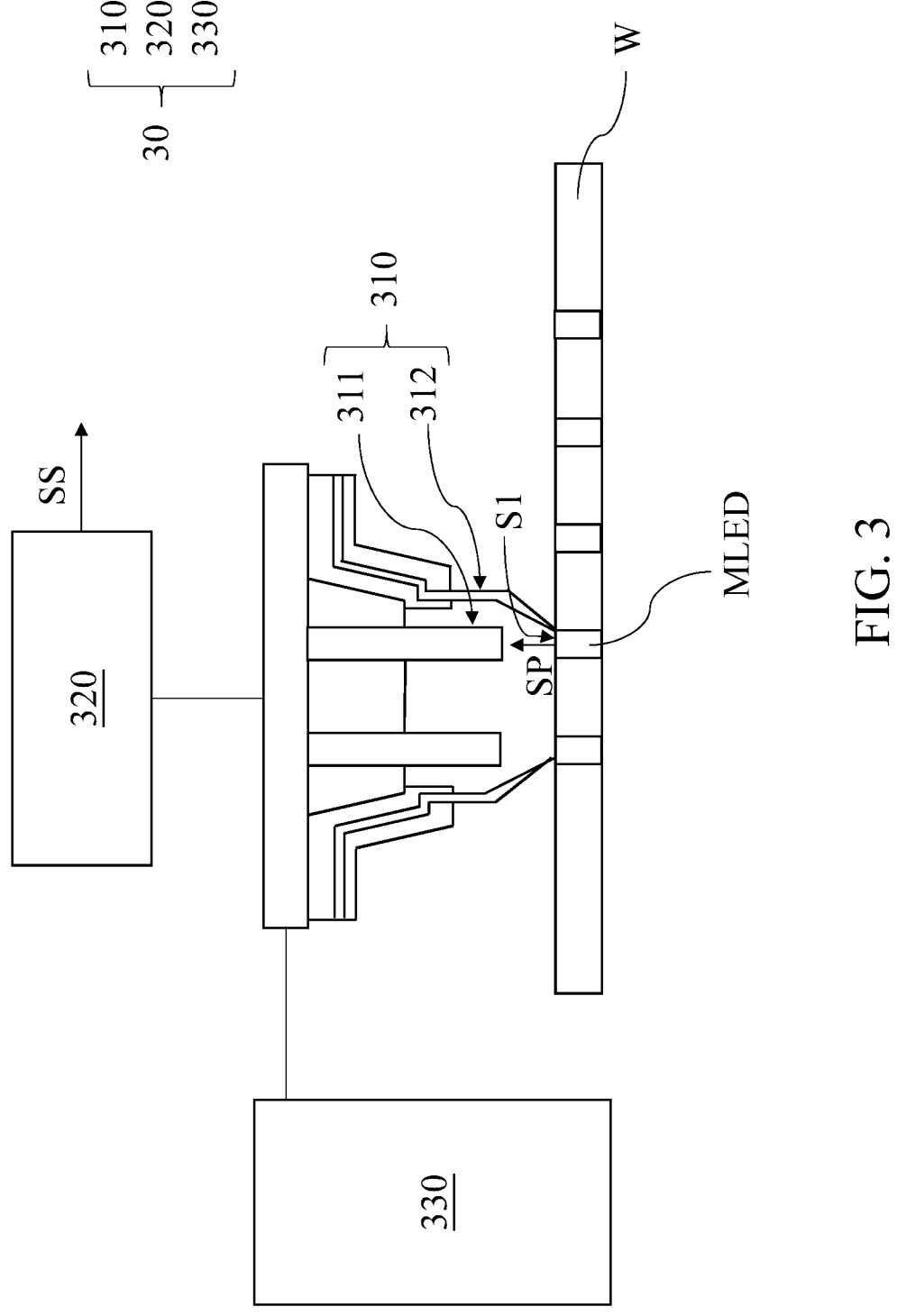
FIG. 3 is a schematic view of an optical signal processing device in some embodiments of the disclosure.

Referring to FIG. 3, there is shown a schematic view of an optical signal processing device 30 in some embodiments of the disclosure. The optical signal processing device 30 measures the optical signals SP generated by multiple micro light-emitting diodes MLED. The optical signal processing device 30 includes multiple optical signal testing units 310, an optical signal sensing device 320 and an alignment device 330.

In some embodiments, the alignment device 330 aligns probes 312 and optical guide units 311 with the micro light-emitting diodes MLED, respectively. As shown in FIG. 3, the alignment device 330 aligns the probes 312 and the optical guide units 311 with the first surfaces S1 of the micro light-emitting diodes MLED. Compared to the optical signal processing device 20, the probes 312 and the optical guide units 311 of the optical signal processing device 30 are disposed on the same side of the micro light-emitting diodes MLED in the course of measurement.

The optical signal testing units 310 each includes one optical guide unit 311 and one probe 312, and corresponds in position to one micro light-emitting diode MLED. The optical guide unit 311 and the probe 312 are disposed on the same side of the micro light-emitting diode MLED. The probe 312 is configured to contact with the micro light-emitting diode MLED to transmit a control signal SC to the micro light-emitting diode MLED to enable the micro light-emitting diode MLED to generate the optical signal SP. The optical guide unit 311 receives the optical signal SP generated by the micro light-emitting diode MLED and transmits the optical signal SP to the optical signal sensing device 320. In some embodiments, the optical guide unit 311 includes an optical fiber. In some embodiments, the optical signal processing device 30 includes at least 48, 240, 480 or 960 optical signal testing units 310.

In some embodiments, the micro light-emitting diodes MLED are light-emitting diodes and are disposed on a wafer W. In some embodiments, the micro light-emitting diodes MLED are wafer-scale micro light-emitting diodes. Thus, the optical signal processing device 30 directly performs an optical signal measurement process on the micro light-emitting diodes on the wafer W; however, the disclosure is not limited thereto. For example, in a variant embodiment, the micro light-emitting diodes MLED are any other devices capable of emitting optical signals, and the optical signal processing device 30 measures non-wafer-scale micro light-emitting diodes MLED.

In some other embodiments, the micro light-emitting diodes MLED are RGB light-emitting diodes. In this embodiment, the optical signal testing units 310 receive RGB optical signals SP generated by the multiple micro light-emitting diodes MLED during a time period, respectively. The optical signals SP can be optical signals in one of the RGB colors, such as red optical signals, green optical signals or blue optical signals.

In some embodiments, one micro light-emitting diode MLED includes pixels of RGB light-emitting diodes and is disposed on a display panel (not shown). Thus, the optical signal processing device 30 performs the optical signal measurement process on the pixels on the display panel.

In some embodiments, the optical signal sensing device 320 is coupled to the optical signal testing units 310 to sense the optical signals SP transmitted from the optical signal testing units 310, and generate a plurality of sensing signals SS according to the optical signals SP. In some embodiments, the optical signal sensing device 320 includes a camera for capturing an image formed from the optical signals SP and formed on an imaging surface in the camera, and then generating the sensing signals SS according to the image. In some embodiments, the optical signal sensing device 320 comprises a CMOS image sensor (CIS) to sense the optical signals SP with photodiodes on the CIS and generate the sensing signals SS accordingly.

In some embodiments, the sensing signals SS are transmitted to an analysis instrument (not shown) and each indicates the performance of one micro light-emitting diode MLED. For example, the analysis instrument analyzes the brightness, chromatic aberration and the like of the micro light-emitting diodes MLED as indicated by the sensing signals SS. Upon confirmation of the brightness and/or chromatic aberration of all the micro light-emitting diodes MLED, all the micro light-emitting diodes MLED undergo binning according to the brightness and/or chromatic aberration, allocating the micro light-emitting diodes MLED with similar brightness and/or chromatic aberration to the same bin.

Figures 4A, 4B, 4C:
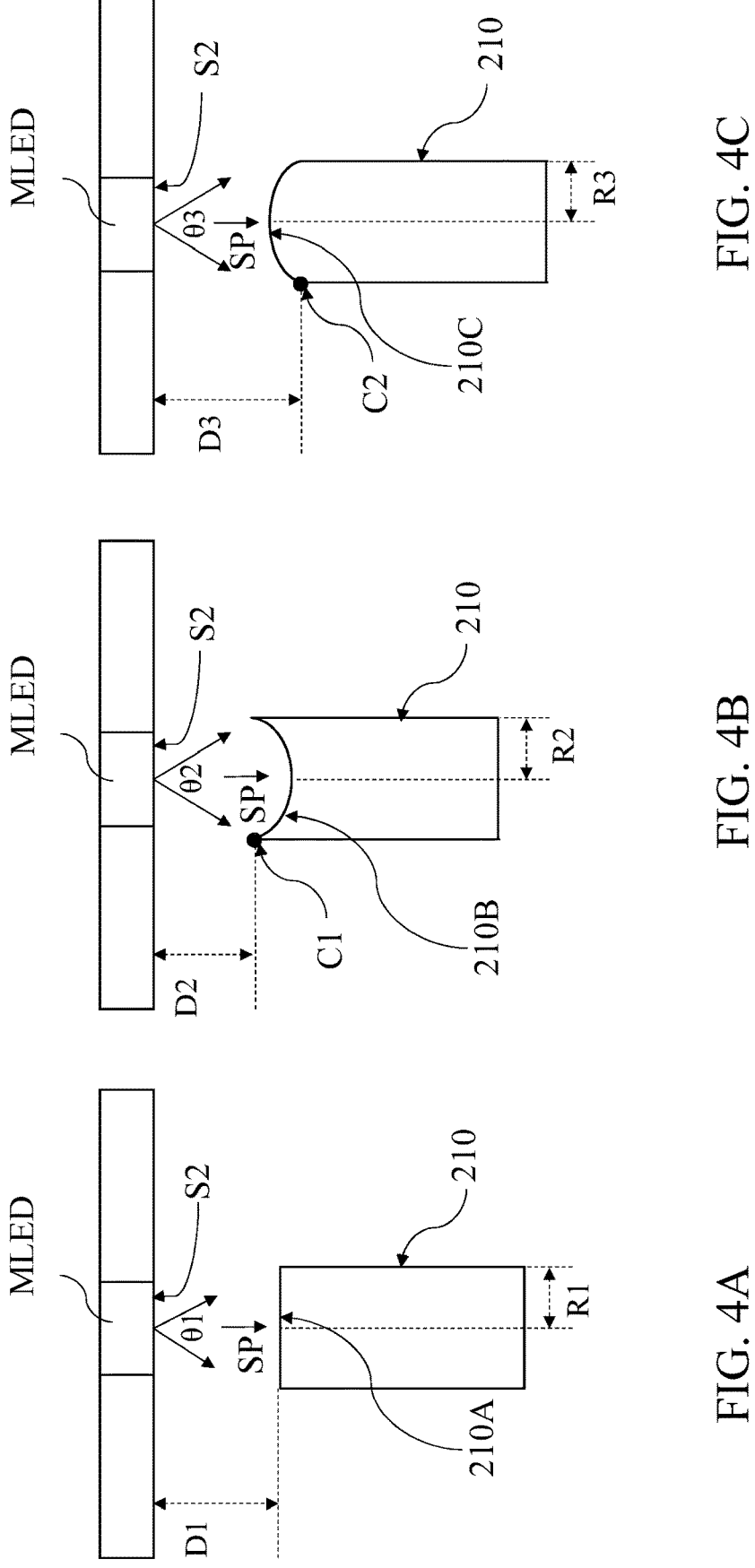
FIG. 4A is a schematic view of the structure and operation of an optical guide unit in some embodiments of the disclosure.
FIG. 4B is a schematic view of the structure and operation of the optical guide unit in some embodiments of the disclosure.
FIG. 4C is a schematic view of the structure and operation of the optical guide unit in some embodiments of the disclosure.

Referring to FIG. 4A, there is shown a schematic view of the structure and operation of the optical guide unit of the optical signal testing unit 210 in some embodiments of the disclosure. In some embodiments, one end of the optical guide unit of the optical signal testing unit 210 configured to receive the optical signal SP includes a flat surface 210A. In order to allow the flat surface 210A to cover the divergence range of the optical signal SP as widely as possible, both the position of the optical guide unit of the optical signal testing unit 210 and distance D1 have to be adjusted according to divergence angle $\theta 1$ of the micro light-emitting diode MLED and an axial radius R1 of the optical guide unit of the optical signal testing unit 210. The distance D1 is adjusted by the alignment device 230. In some embodiments, the optical signal reception range of the optical guide unit entirely covers (or only covers) the divergence range of the optical signal SP of the micro light-emitting diode MLED but does not cover the divergence ranges of the optical signals SP of adjacent micro light-emitting diodes MLED. Thus, the optical signal SP received by the optical guide unit remains unaffected regardless of whether the adjacent micro light-emitting diodes MLED generate the optical signals SP or not. In some other embodiments, the optical signal reception range of the optical guide unit only covers part of the divergence range of the optical signal SP of the micro light-emitting diode MLED, and thus part of the divergence range of the optical signal SP of the micro light-emitting diode MLED may fall within the optical signal reception range of another optical guide unit. In the aforesaid situation, to protect the optical signals falling within the optical signal reception range of the optical guide unit against interference from other signals, it is feasible to turn on adjacent or neighboring micro light-emitting diodes MLED during different time periods, respectively, such that the optical guide unit receiving the optical signal SP is subjected to minimal interference from the optical signals SP generated by adjacent or neighboring micro light-emitting diodes MLED, reducing distortion. In some embodiments, the second surface S2 of the micro light-emitting diode MLED is parallel to the flat surface 210A. In some other embodiments, the second surface S2 of the micro light-emitting diode MLED is not parallel to the flat surface 210A.

The distance D1 between the flat surface 210A and the second surface S2 of the micro light-emitting diode MLED must at least satisfy equation (1):

$$D1 \le R1 \times \left( \tan\left(\frac{\theta 1}{2}\right) \right)^{-1} \qquad \text{equation (1)}$$

In some embodiments, in order to allow the flat surface 210A to cover the whole divergence range of the optical signal SP, the distance D1 has to be decreased when the divergence angle θ1 increases, and the distance D1 has to be increased when the divergence angle θ1 decreases. Thus, the greater the divergence angle θ1 is, the shorter the distance D1 is.

Referring to FIG. 4B, there is shown a schematic view of the structure and operation of the optical guide unit of the optical signal testing unit 210 in some embodiments of the disclosure. In some embodiments, one end of the optical guide unit of the optical signal testing unit 210 configured to receive the optical signal SP includes a concave surface 210B. Likewise, the position of the optical guide unit of the optical signal testing unit 210 and distance D2 have to be adjusted according to divergence angle θ2 of the micro light-emitting diode MLED and an axial radius R2 of the optical guide unit of the optical signal testing unit 210. The distance D2 is adjusted by the alignment device 230. In some embodiments, the sidewall of the optical guide unit of the optical signal testing unit 210 and the concave surface 210B cross at a crossing C1, and the distance D2 is the shortest distance between the second surface S2 of the micro light-emitting diode MLED and the crossing C1.

The distance D2 between the concave surface 210B and the second surface S2 of the micro light-emitting diode MLED must at least satisfy equation (2):

$$D2 \le R2 \times \left( \tan\left(\frac{\theta 2}{2}\right) \right)^{-1} \qquad \text{equation (2)}$$

In some embodiments, in order to allow the concave surface 210B to cover the whole divergence range of the optical signal SP, the distance D2 has to be decreased when the divergence angle θ2 increases, and the distance D2 has to be increased when the divergence angle θ2 decreases. Thus, the greater the divergence angle θ2 is, the shorter the distance D2 is.

Referring to FIG. 4C, there is shown a schematic view of the structure and operation of the optical guide unit of the optical signal testing unit 210 in some embodiments of the disclosure. In some embodiments, one end of the optical guide unit of the optical signal testing unit 210 configured to receive the optical signal SP includes a convex surface 210C. In some embodiments, the sidewall of the optical guide unit of the optical signal testing unit 210 and the convex surface 210C cross at a crossing C2. Likewise, the position of the optical guide unit of the optical signal testing unit 210 and distance D3 have to be adjusted according to divergence angle θ3 of the micro light-emitting diodes MLED and an axial radius R3 of the optical guide unit of the optical signal testing unit 210. The distance D3 is adjusted by the alignment device 230.

The distance D3 between the convex surface 210C and the second surface S2 of the micro light-emitting diode MLED must at least satisfy equation (3):

$$D3 \le R3 \times \left( \tan\left(\frac{\theta 3}{2}\right) \right)^{-1} \qquad \text{equation (3)}$$

In some embodiments, in order to allow the convex surface 210C to cover the whole divergence range of the optical signal SP, the distance D3 has to be decreased when the divergence angle θ3 increases, and the distance D3 has to be increased when the divergence angle θ3 decreases. Thus, the greater the divergence angle θ3 is, the shorter the distance D3 is.

In some embodiments, the radius R1, radius R2 and radius R3 are equal to each other. In some embodiments, the divergence angle θ1, divergence angle θ2 and divergence angle θ3 are equal to each other. In some embodiments, the radius R1, radius R2 and radius R3 are the axial radius of the core of the optical fiber of the optical guide unit of the optical signal testing unit 210.

Figures 5A, 5B, 5C:
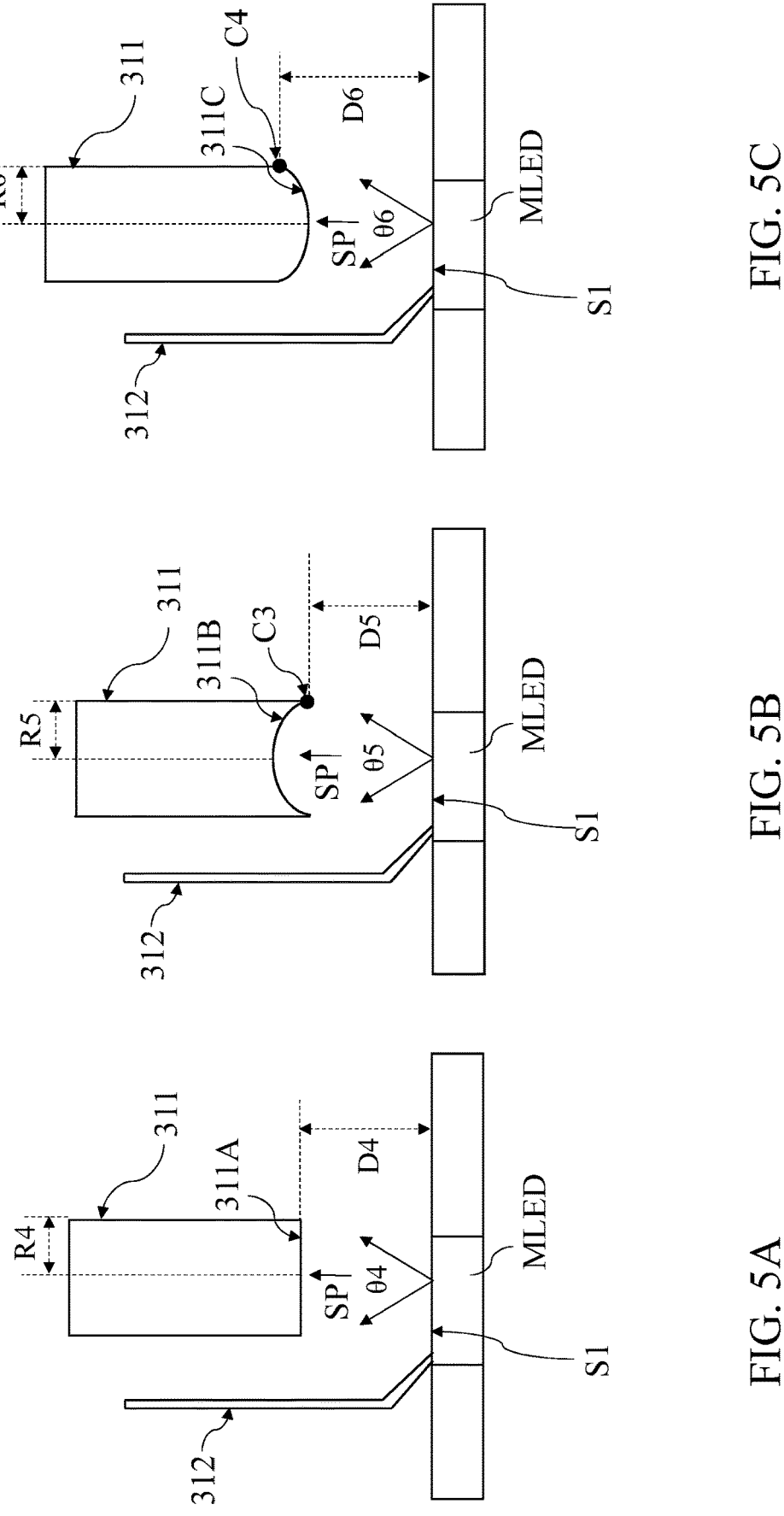
FIG. 5A is a schematic view of the structure and operation of the optical guide unit in some embodiments of the disclosure.
FIG. 5B is a schematic view of the structure and operation of the optical guide unit in some embodiments of the disclosure.
FIG. 5C is a schematic view of the structure and operation of the optical guide unit in some embodiments of the disclosure.

The structures and operations of the optical guide units 311 shown in FIG. 5A, FIG. 5B and FIG. 5C are similar to the structures and operations of the optical guide units of the optical signal testing units 210 shown in FIG. 4A, FIG. 4B and FIG. 4C. Thus, in their respective embodiments, ends of the optical guide units 311 configured to receive the optical signals SP include a flat surface 311A, a concave surface 311B and a convex surface 311C, respectively, and the flat surface 311A, the concave surface 311B and the convex surface 311C are separated from the first surface S1 of the micro light-emitting diode MLED by a distance that must at least satisfy equation (4):

$$D \le R \times \left( \tan\left(\frac{\theta}{2}\right) \right)^{-1} \qquad \text{equation (4)}$$

D represents the distance D4, D5, or D6 between an end of the optical guide unit 311 configured to receive the optical signal SP and the first surface S1 of the micro light-emitting diode MLED. R represents the axial radius R4, R5 or R6 of the optical guide unit 311. θ represents the divergence angle θ4, θ5 or θ6 of the micro light-emitting diode MLED.

In some embodiments, the distance D4 is the shortest distance between the first surface S1 of the micro light-emitting diode MLED and the flat surface 311A. In some embodiments, the distance D5 is the shortest distance between the first surface S1 of the micro light-emitting diode MLED and the concave surface 311B. In some embodiments, the sidewall of the optical guide unit 311 and the concave surface 311B cross at a crossing C3, and the distance D5 is the shortest distance between the first surface S1 of the micro light-emitting diode MLED and the crossing C3. In some embodiments, the sidewall of the optical guide unit 311 and the convex surface 311C cross at a crossing C4, and the distance D6 is the shortest distance between the first surface S1 of the micro light-emitting diode MLED and the crossing C4. In some embodiments, the radius R4, radius R5 and radius R6 are the axial radius of the core of the optical fiber of the optical guide unit 311.

In some embodiments, in order to allow the flat surface 311A to cover the whole divergence range of the optical signal SP, the distance D4, D5 or D6 has to be decreased when the divergence angle θ4, θ5 or θ6 increases, and the distance D4, D5 or D6 has to be increased when the divergence angle θ4, θ5 or θ6 decreases. Thus, the larger the divergence angle θ4, θ5 or θ6 is, the shorter the distance D4, D5 or D6 is. Likewise, the smaller the divergence angle θ4, θ5 or θ6 is, the longer the distance D4, D5 or D6 is.

Figure 6A:
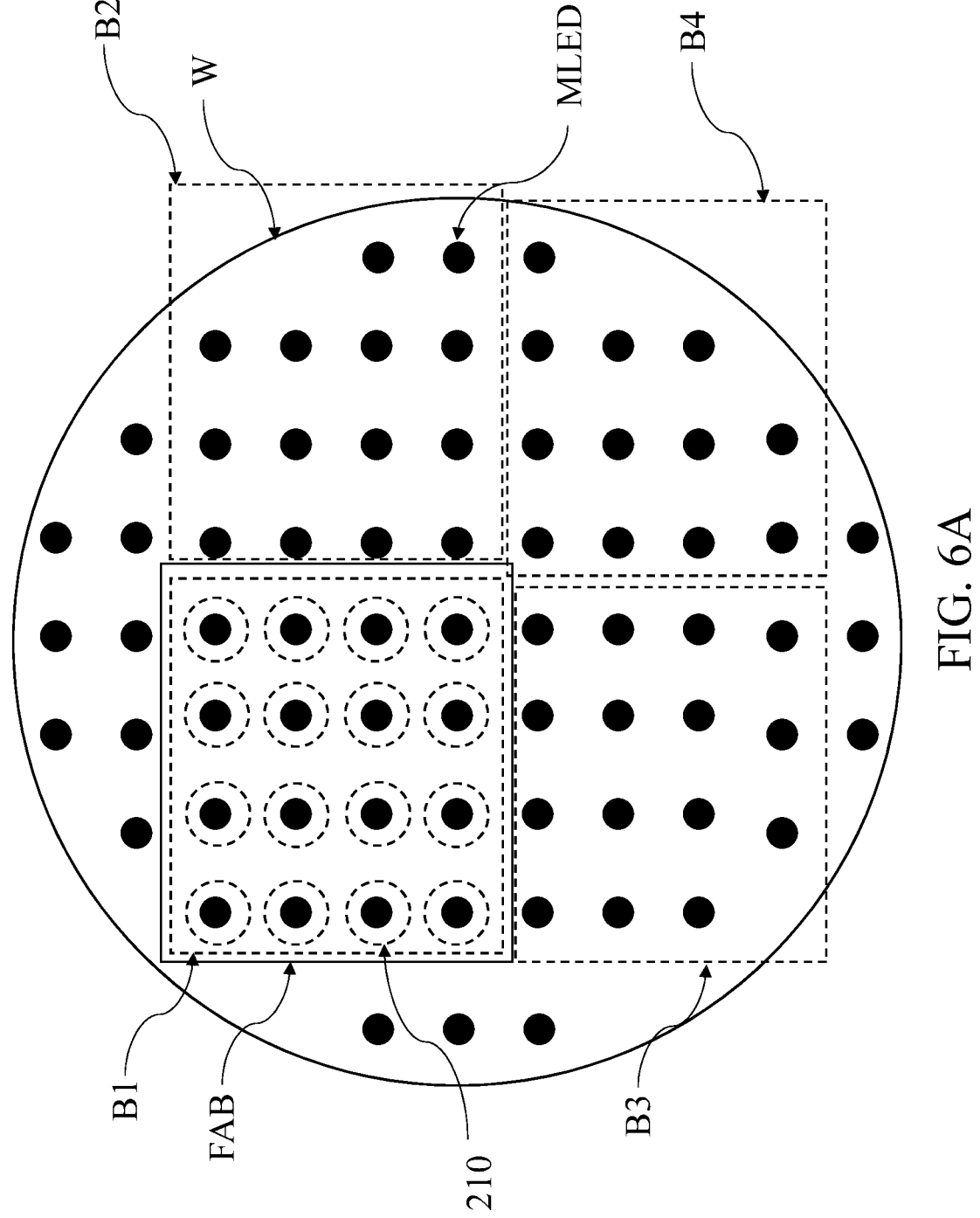
FIG. 6A is a schematic view of the operation of a fiber array block (FAB) and a wafer in some embodiments of the disclosure.
Figure 6B:
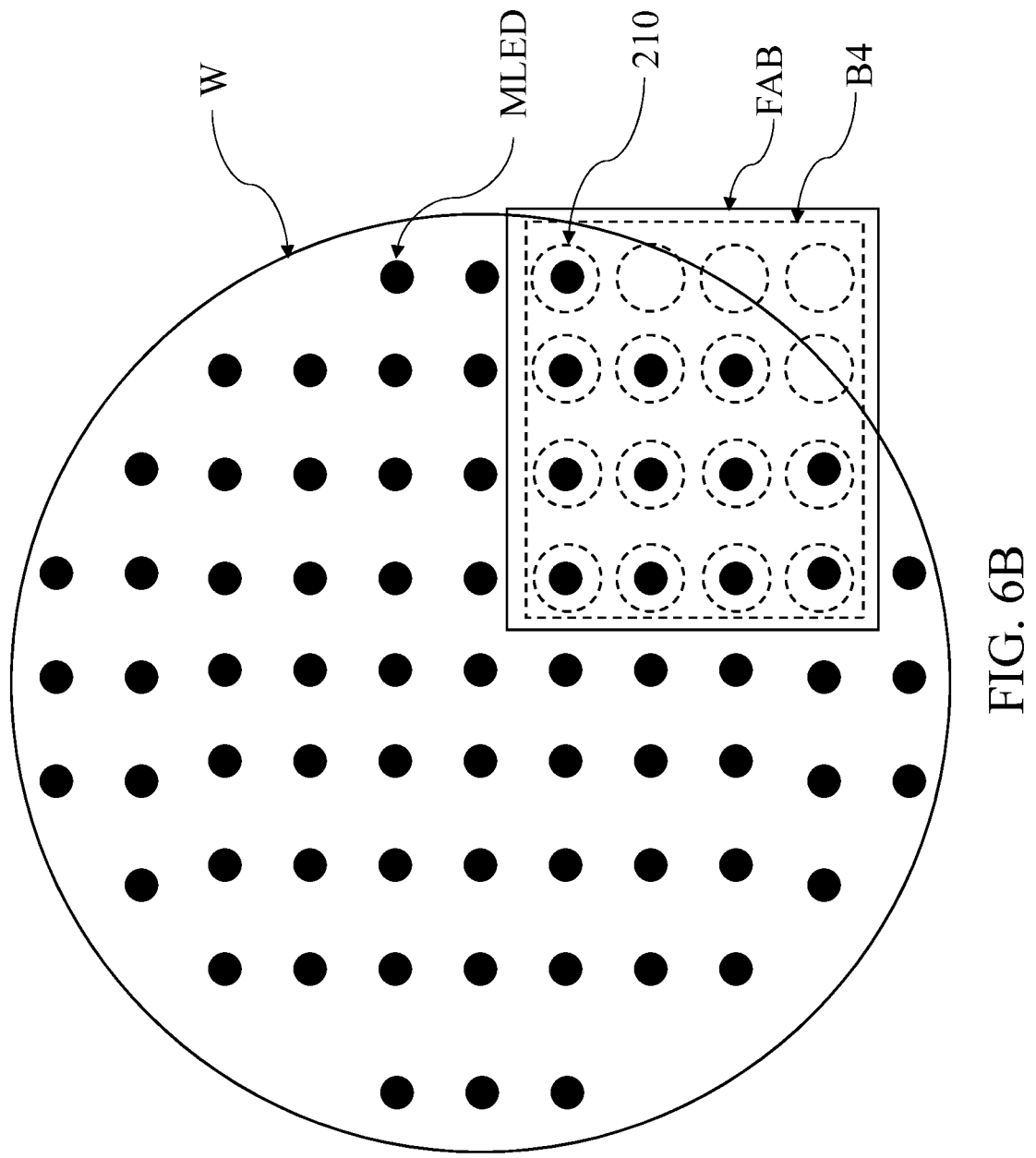
FIG. 6B is a schematic view of the operation of the FAB and a wafer in some embodiments of the disclosure.
Figure 6C:
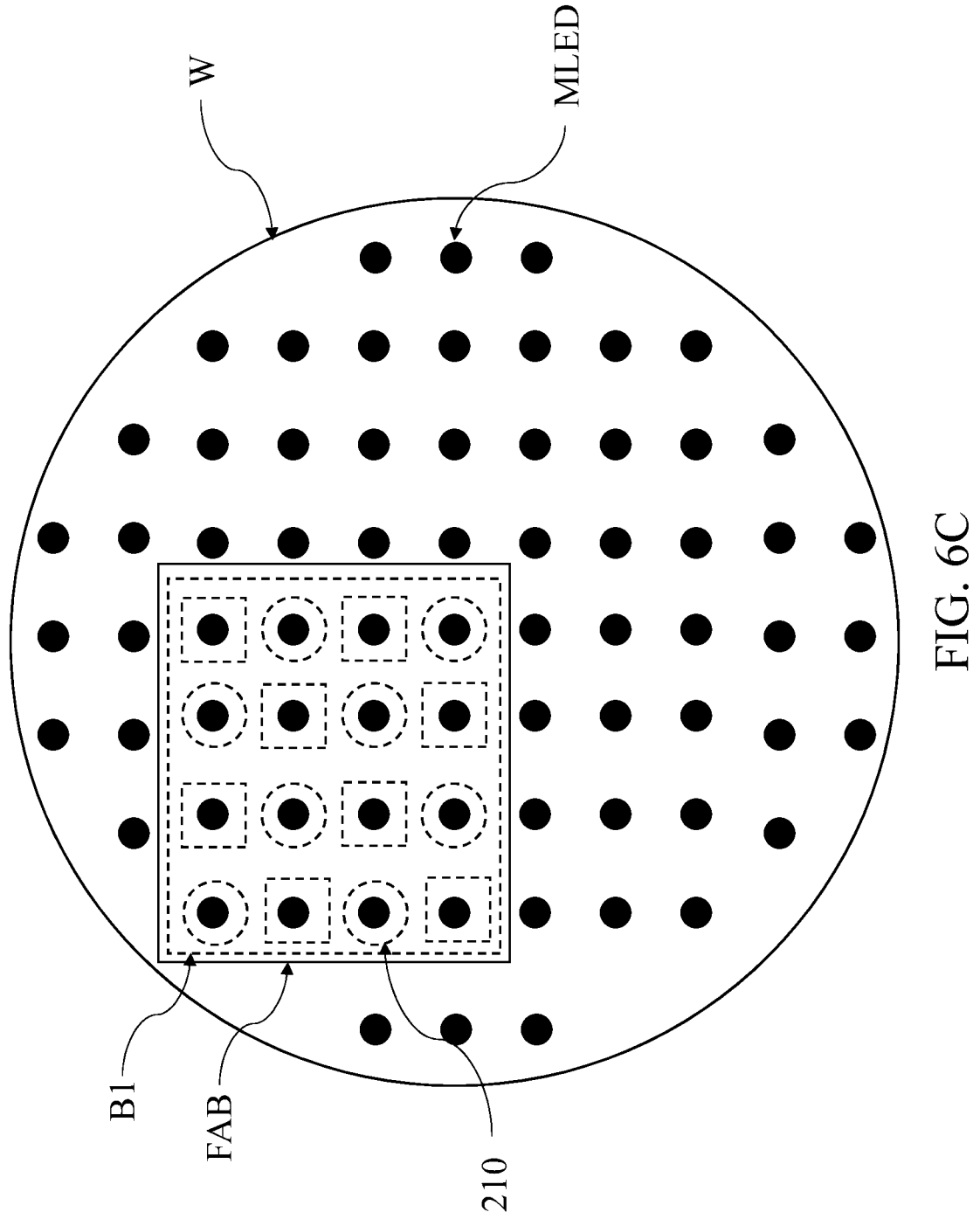
FIG. 6C is a schematic view of the operation of the FAB and a wafer in some embodiments of the disclosure.

Referring to FIG. 6A through FIG. 6C, there are shown schematic views of operation of a fiber array block (FAB) and the wafer W according to some embodiments of the present disclosure. In some embodiments, the number of the optical signal testing units 210 in the FAB is less than the number of the micro light-emitting diodes MLED of the micro light-emitting diode array on the wafer W. To render the accompanying diagrams concise and illustrative of the disclosure, the number and dimensions of the optical signal testing units 210 and the micro light-emitting diodes MLED in the schematic views shown in FIG. 6A through FIG. 6C are illustrative. In the illustrated embodiments, the number of the optical fibers in the FAB and the number of the corresponding micro light-emitting diodes MLED are 16 for exemplary purposes. In some embodiments, one wafer W includes more than 16 micro light-emitting diodes MLED, and the FAB includes different numbers of optical signal testing units 210. For example, the optical signal processing device 20 includes at least 48, 240, 480 or 960 optical signal testing units 210, whereas the micro light-emitting diodes MLED are in the number of at least 48, 240, 480 or 960.

Referring to FIG. 6A, the FAB includes 16 optical signal testing units 210, and the micro light-emitting diode array is divided into a plurality of testing blocks B1, B2, B3 and B4 (whose borders are indicated by dashed lines in the diagrams). In the FAB of the optical signal processing device 20, the testing blocks are tested one by one. Thus, one testing block is selected for testing in every one instance. In the example illustrated by FIG. 6A, the testing block B1 is selected to undergo testing such that the FAB aligns the 16 micro light-emitting diodes MLED in the testing block B1 during an instance of alignment process (for example, illustrated by FIG. 6A) carried out with the alignment device 230.

Referring to FIG. 6B, the FAB includes 16 optical signal testing units 210. In the example illustrated by FIG. 6B, the selected testing block B4 undergoes testing such that the micro light-emitting diodes MLED located in the testing block B4 and aligned by the FAB may be in the number of 16 or less during an instance of alignment process (for example, illustrated by FIG. 6B) carried out with the alignment device 230.

Referring to FIG. 6C, the FAB includes 16 optical signal testing units 210. In the example illustrated by FIG. 6C, the selected testing block B1 undergoes testing such that the 16 micro light-emitting diodes MLED in the testing block B1 are aligned by the FAB during an instance of alignment process (for example, illustrated by FIG. 6C) carried out with the alignment device 230. An LED has a light-emitting angle, i.e., the divergence angle of the light emitted by the LED. In particular, the micro light-emitting diodes MLED are small and packed tightly; as a result, the neighboring micro light-emitting diodes MLED emit light simultaneously and cause mutual light interference to the detriment of the reception by the optical signal testing units 210 of the optical signals of the micro light-emitting diodes MLED. To reduce light interference, the micro light-emitting diodes MLED of the testing block B1 are divided into two or more groups arranged alternately such that each group of the micro light-emitting diodes MLED are turned on during a unique time period. As a result, the optical signal testing units 210 are divided into two or more groups corresponding in position to the micro light-emitting diodes MLED of the testing block B1, respectively.

As shown in FIG. 6C, the optical signal testing units 210 are divided into two groups for exemplary purposes, with the first group indicated by dashed circles, and the second group indicated by dashed squares. The optical signal testing units 210 of first group correspond in position to the micro light-emitting diodes MLED of first group, respectively. The optical signal testing units 210 of second group correspond in position to the micro light-emitting diodes MLED of second group, respectively. The micro light-emitting diodes MLED of first group alternate with the micro light-emitting diodes MLED of second group; for example, as shown in FIG. 6C, the micro light-emitting diodes MLED of first group are arranged in a checkered pattern and spaced apart by one unit, and the micro light-emitting diodes MLED of second group are arranged in a checkered pattern and spaced apart by one unit, with the micro light-emitting diodes MLED of first group alternating with the micro light-emitting diodes MLED of second group. Each micro light-emitting diode MLED in the first group of micro light-emitting diodes MLED does not belong to the second group. In some embodiments, the number of the optical signal testing units 210 of the FAB must at least be equal to or greater than the number of all the micro light-emitting diodes. Thus, the total number of micro light-emitting diodes in the two groups is equal to or less than the number of the optical signal testing units 210 of the FAB.

In this embodiment, the eight micro light-emitting diodes MLED of first group are turned on during the first time period to allow the optical signal testing units 210 to undergo the first instance of measurement during the first time period and receive light from the corresponding eight micro light-emitting diodes MLED, whereas the eight micro light-emitting diodes MLED of second group are turned on during the second time period to allow the optical signal testing units 210 to undergo the second instance of measurement during the second time period and receive light from the corresponding eight micro light-emitting diodes MLED. The FAB need not be positioned anew relative to the micro light-emitting diodes MLED in the course of the first instance of measurement and the second instance of measurement. Thus, the position of the optical signal sensing device 220 remains unchanged during the first time period and the second time period.

Figure 7A:
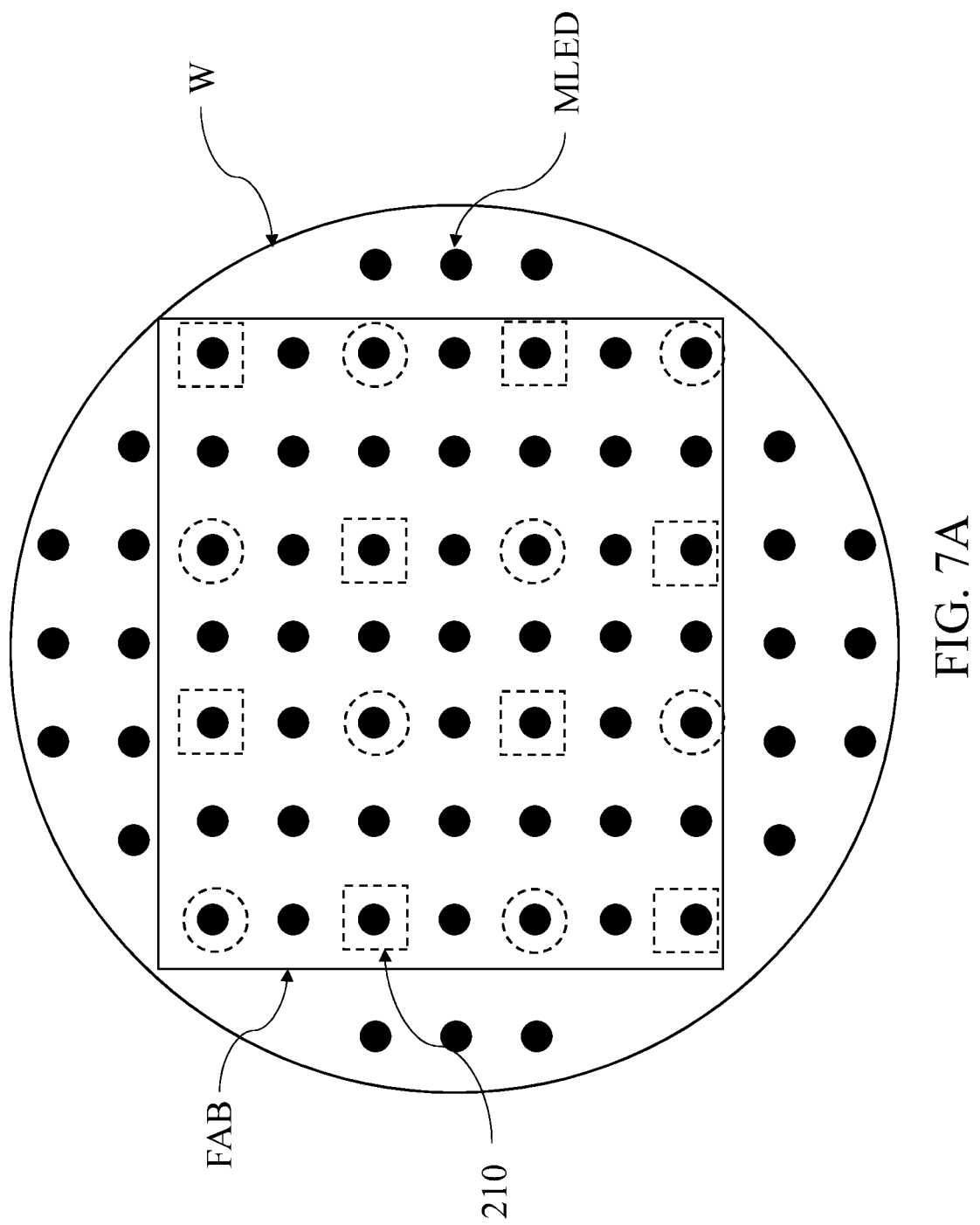
FIG. 7A is a schematic view of the operation of the FAB and a wafer in some embodiments of the disclosure.

As shown in FIG. 7A, the optical signal testing units 210 are divided into two groups for exemplary purposes, with the first group indicated by dashed circles, and the second group indicated by dashed squares. The optical signal testing units 210 of first group correspond in position to the micro light-emitting diodes MLED of first group, respectively. The optical signal testing units 210 of second group correspond in position to the micro light-emitting diodes MLED of second group, respectively. The micro light-emitting diodes MLED of first group alternate with the micro light-emitting diodes MLED of second group; for example, as shown in FIG. 7A, the micro light-emitting diodes MLED of first group are arranged in a checkered pattern and spaced apart by three units, and the micro light-emitting diodes MLED of second group are arranged in a checkered pattern and spaced apart by three units, with the micro light-emitting diodes MLED of first group alternating with the micro light-emitting diodes MLED of second group. Each micro light-emitting diode MLED in the first group of micro light-emitting diodes MLED does not belong to the second group. In some embodiments, the number of the optical signal testing units 210 of the FAB must at least be equal to or greater than the number of all the micro light-emitting diodes. Thus, the total number of micro light-emitting diodes in the two groups is equal to or less than the number of the optical signal testing units 210 of the FAB.

In this embodiment, the eight micro light-emitting diodes MLED of first group are turned on during the first time period to allow the optical signal testing units 210 to undergo the first instance of measurement during the first time period and receive light from the corresponding eight micro light-emitting diodes MLED, whereas the eight micro light-emitting diodes MLED of second group are turned on during the second time period to allow the optical signal testing units 210 to undergo the second instance of measurement during the second time period and receive light from the corresponding eight micro light-emitting diodes MLED. The FAB need not be positioned anew relative to the micro light-emitting diodes MLED in the course of the first instance of measurement and the second instance of measurement. Thus, the position of the optical signal sensing device 220 remains unchanged during the first time period and the second time period.

It is noteworthy that the aforesaid spacing unit is not restrictive of the embodiments of the disclosure. Persons skilled in the art may adjust the alternation and the spacing unit of the micro light-emitting diodes MLED of first group and the micro light-emitting diodes MLED of second group as needed.

Figure 7B:
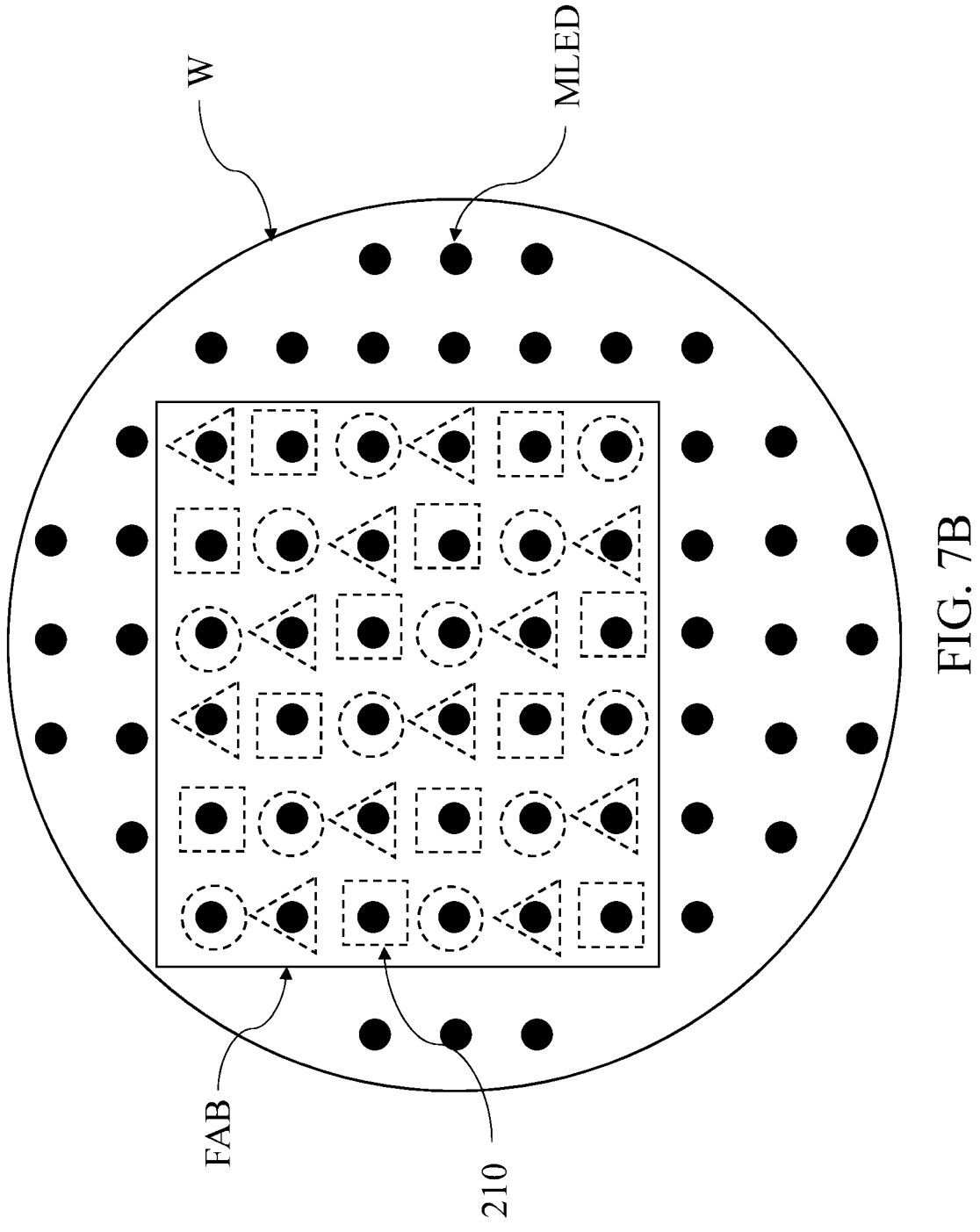
FIG. 7B is a schematic view of the operation of the FAB and a wafer in some embodiments of the disclosure.

Referring to FIG. 7B, the FAB includes optical signal testing units 210, and the FAB aligns with 36 micro light-emitting diodes MLED during an instance of alignment process (for example, illustrated by FIG. 7B) carried out with the alignment device 230. An LED has a light-emitting angle, i.e., the divergence angle of the light emitted by the LED. In particular, micro light-emitting diodes MLED are small and tightly packed; as a result, the neighboring micro light-emitting diodes MLED emit light simultaneously and cause mutual light interference to the detriment of the reception by the optical signal testing units 210 of the optical signals of the micro light-emitting diodes MLED. To reduce light interference, the micro light-emitting diodes MLED are divided into two or more groups arranged alternately such that micro light-emitting diodes MLED of each group are turned on during a unique time period. As a result, the optical signal testing units 210 are divided into two or more groups corresponding in position to the micro light-emitting diodes MLED.

As shown in FIG. 7B, the optical signal testing units 210 are divided into three groups for exemplary purposes, with the first group indicated by dashed circles, the second group indicated by dashed squares, and the third group indicated by dashed triangles. The optical signal testing units 210 of first group correspond in position to the micro light-emitting diodes MLED of first group, respectively. The optical signal testing units 210 of second group correspond in position to the micro light-emitting diodes MLED of second group, respectively. The optical signal testing units 210 of third group correspond in position to the micro light-emitting diodes MLED of third group, respectively. The micro light-emitting diodes MLED of first group, second group and third group alternate with each other; for example, as shown in FIG. 7B, the micro light-emitting diodes MLED of first, second and third groups arranged in the same column are spaced apart by two units, and those arranged in the same row by two units. Each micro light-emitting diode MLED in the first group, second group and third group is not belong to other group except to its own group. In some embodiments, the number of the optical signal testing units 210 of the FAB must at least be equal to or greater than the number of all the micro light-emitting diodes. Thus, the total number of the micro light-emitting diodes in the three groups is equal to or less than the number of the optical signal testing units 210 of the FAB.

In this embodiment, the 12 micro light-emitting diodes MLED of first group are turned on during the first time period to allow the optical signal testing units 210 to undergo the first instance of measurement during the first time period and receive light from the corresponding 12 micro light-emitting diodes MLED. Likewise, the 12 micro light-emitting diodes MLED of second group are turned on during the second time period to allow the optical signal testing units 210 to undergo the second instance of measurement during the second time period and receive light from the corresponding 12 micro light-emitting diodes MLED. The 12 micro light-emitting diodes MLED of third group are turned on during the third time period to allow the optical signal testing units 210 to undergo the third instance of measurement during the third time period and receive light from the corresponding 12 micro light-emitting diodes MLED. The FAB need not be positioned anew relative to the micro light-emitting diodes MLED in the course of the first instance of measurement, the second instance of measurement and the third instance of measurement. Thus, the position of the optical signal sensing device 220 remains unchanged during the first time period, second time period and third time period.

In the embodiments illustrated by FIG. 6A through FIG. 7B, owing to a circuit distance or a design choice, during an instance of alignment process, the micro light-emitting diodes MLED aligned by the FAB generate the optical signals SP at different time points within the same time period, and the FAB transmits the optical signals SP generated at multiple different time points within the time period. In some other embodiments, the micro light-emitting diodes MLED simultaneously generate the optical signals SP, the FAB simultaneously transmits the optical signals SP.

Figure 8:
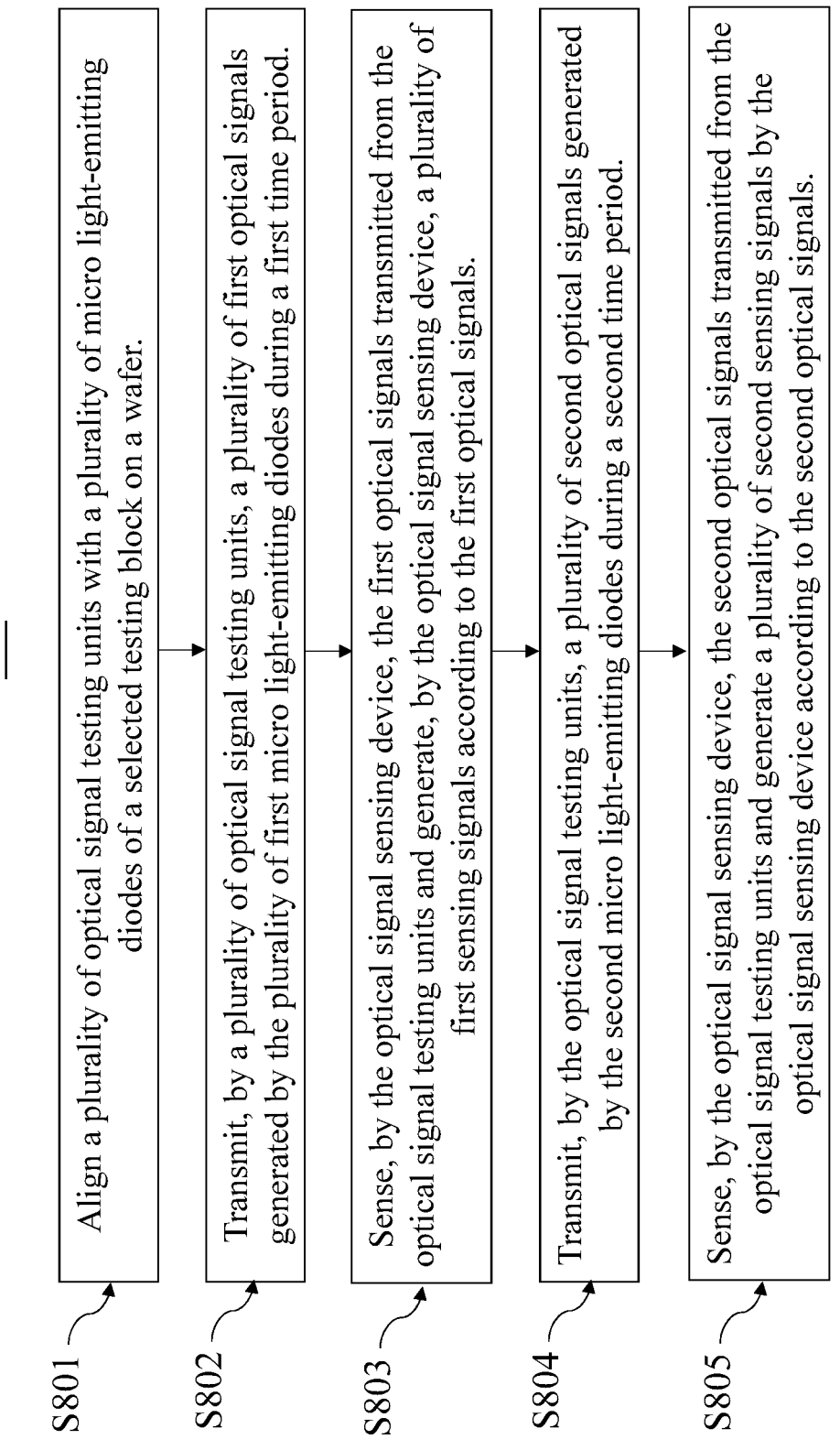
FIG. 8 is a flow chart of a measurement method in some embodiments of the disclosure.

Referring to FIG. 8, there is a flow chart of an optical signal measurement method 800 according to some embodiments of the present disclosure. In some embodiments, the measurement method 800 is implemented with an optical signal processing device (for example, the optical signal processing device of the aforesaid embodiments). The optical signal processing device includes a plurality of optical signal testing units and an optical signal sensing device. The optical signal processing device tests the optical signals of a micro light-emitting diode array. The micro light-emitting diode array is divided into a plurality of testing blocks. Each testing block includes a plurality of micro light-emitting diodes. The optical signal processing device tests one single testing block in each instance. The steps of the measurement method 800 are described in detail below.

Step S801: Align a plurality of optical signal testing units with a plurality of micro light-emitting diodes of a selected testing block on a wafer. The plurality of micro light-emitting diodes include a plurality of first micro light-emitting diodes and a plurality of second micro light-emitting diodes. Step S802: Transmit, by a plurality of optical signal testing units, a plurality of first optical signals generated by the plurality of first micro light-emitting diodes during a first time period. Each of the optical signal testing units transmits the first optical signal generated by a corresponding one of the first micro light-emitting diodes. Step S803: Sense, by the optical signal sensing device, the first optical signals transmitted from the optical signal testing units and generate, by the optical signal sensing device, a plurality of first sensing signals according to the first optical signals.

Step S804: Transmit, by the optical signal testing units, a plurality of second optical signals generated by the second micro light-emitting diodes during a second time period. Each of the optical signal testing units transmits the second optical signal generated by a corresponding one of the second micro light-emitting diodes. Step S805: Sense, by the optical signal sensing device, the second optical signals transmitted from the optical signal testing units and generate a plurality of second sensing signals by the optical signal sensing device according to the second optical signals.

In some embodiments, upon completion of step S802, it is not necessary to move the wafer or the optical signal processing device, and thus the position of a plurality of optical signal testing units remains unchanged during the first time period and the second time period. In some embodiments, a plurality of first micro light-emitting diodes and a plurality of second micro light-emitting diodes correspond in position to the optical signal testing units, respectively, and each of the optical signal testing units transmits an optical signal generated by a corresponding one of the micro light-emitting diodes. In some embodiments, a plurality of first micro light-emitting diodes are disposed on the wafer and alternate with a plurality of second micro light-emitting diodes. In some embodiments, the first time period and the second time period do not overlap. In some embodiments, the optical signal testing units are in a one-to-one relation with the micro light-emitting diodes.

Referring to FIG. 9, there is a flow chart of an optical signal measurement method 900 according to some embodiments of the present disclosure. In some embodiments, the measurement method 900 is implemented with an optical signal processing device (for example, the optical signal processing device of the aforesaid embodiments). The optical signal processing device includes a plurality of optical signal testing units and an optical signal sensing device. The optical signal processing device tests the optical signals of a micro light-emitting diode array. The micro light-emitting diode array is divided into a plurality of testing blocks. Each testing block includes a plurality of micro light-emitting diodes. The optical signal processing device tests one single testing block in each instance. The steps of the measurement method 900 are described in detail below.

Step S901: Align the optical signal testing units with a plurality of micro light-emitting diodes of a selected testing block on a wafer. The plurality of micro light-emitting diodes include a plurality of first micro light-emitting diodes, a plurality of second micro light-emitting diodes and a plurality of third micro light-emitting diodes. Step S902: Transmit, by the optical signal testing units, a plurality of first optical signals generated by the first micro light-emitting diodes during a first time period. Each of the optical signal testing units transmits the first optical signal generated by a corresponding one of the first micro light-emitting diodes. Step S903: Sense, by the optical signal sensing device, the first optical signals transmitted from the optical signal testing units and generate, by the optical signal sensing device, a plurality of first sensing signals according to the first optical signals.

Step S904: Transmit, by the optical signal testing units, a plurality of second optical signals generated by the second micro light-emitting diodes of a selected testing block during a second time period. Each of the optical signal testing units transmits the second optical signal generated by a corresponding one of the second micro light-emitting diodes. Step S905: Sense, by the optical signal sensing device, the second optical signals transmitted from the optical signal testing units and generate a plurality of second sensing signals by the optical signal sensing device according to the second optical signals.

Step S906: Transmit, by the optical signal testing units, a plurality of third optical signals generated by the plurality of third micro light-emitting diodes during a third time period. Each of the optical signal testing units transmits an optical signal generated by a corresponding one of the third micro light-emitting diodes. Step S907: Sense, by the optical signal sensing device, the plurality of third optical signals transmitted from the optical signal testing units and generate, by the optical signal sensing device, a plurality of third sensing signals according to the plurality of third optical signals.

In some embodiments, upon completion of step S902 and step S904, it is not necessary to move the wafer or the optical signal processing device, and thus the position of a plurality of optical signal testing units remains unchanged during the first time period, second time period and third time period. In some embodiments, a plurality of first micro light-emitting diodes, a plurality of second micro light-emitting diodes and a plurality of third micro light-emitting diodes are alternately disposed on the wafer. In some embodiments, the first time period, second time period and third time period do not overlap. In some embodiments, the optical signal testing units are in a one-to-one relation with the micro light-emitting diodes.

Figure 10:
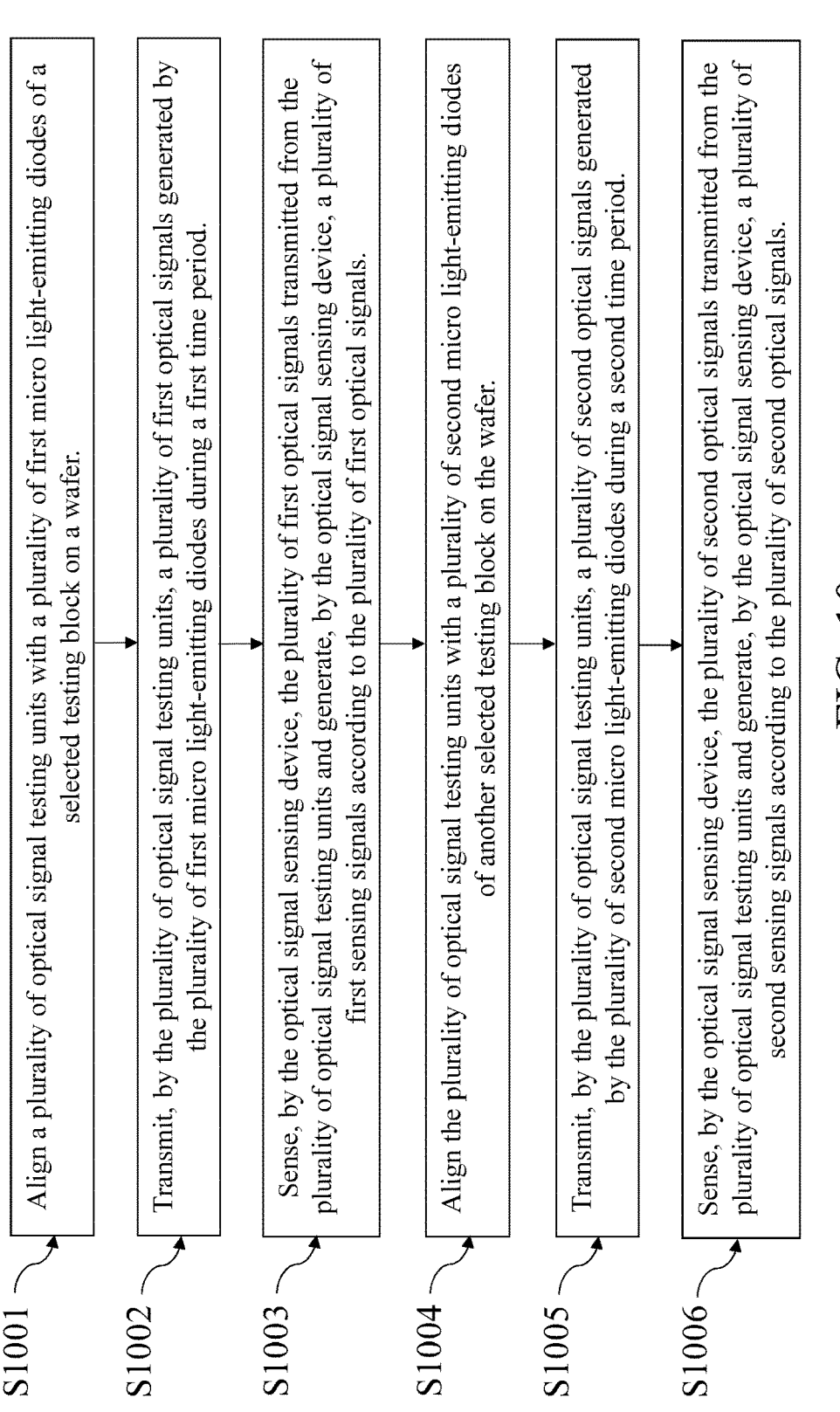
FIG. 10 is a flow chart of a measurement method in some embodiments of the disclosure.

Referring to FIG. 10, there is a flow chart of an optical signal measurement method 1000 according to some embodiments of the present disclosure. In some embodiments, the measurement method 1000 is implemented with an optical signal processing device (for example, the optical signal processing device of the aforesaid embodiments). The optical signal processing device includes a plurality of optical signal testing units and an optical signal sensing device. The steps of the measurement method 1000 are described in detail below.

Step S1001: Align a plurality of optical signal testing units with a plurality of first micro light-emitting diodes of a selected testing block on a wafer. Step S1002: Transmit, by the plurality of optical signal testing units, a plurality of first optical signals generated by the plurality of first micro light-emitting diodes during a first time period. Each of the optical signal testing units transmits an optical signal generated by a corresponding one of the first micro light-emitting diodes. Step S1003: Sense, by the optical signal sensing device, the plurality of first optical signals transmitted from the plurality of optical signal testing units and generate, by the optical signal sensing device, a plurality of first sensing signals according to the plurality of first optical signals.

Step S1004: Align the plurality of optical signal testing units with a plurality of second micro light-emitting diodes of another selected testing block on the wafer. Step S1005: Transmit, by the plurality of optical signal testing units, a plurality of second optical signals generated by the plurality of second micro light-emitting diodes during a second time period. Each of the optical signal testing units transmits the optical signal generated by a corresponding one of the second micro light-emitting diodes. Step S1006: Sense, by the optical signal sensing device, the plurality of second optical signals transmitted from the plurality of optical signal testing units and generate, by the optical signal sensing device, a plurality of second sensing signals according to the plurality of second optical signals.

In some embodiments, the aforesaid alignment process is achieved by moving the wafer. For instance, step S1001 entails moving the wafer to align a plurality of optical signal testing units with a plurality of first micro light-emitting diodes on the wafer, whereas step S1004 entails moving the wafer to align a plurality of optical signal testing units with a plurality of second micro light-emitting diodes on the wafer.

According to some prior arts, light-emitting devices have increasingly small dimensions as needed (for example, micro light-emitting diodes), which causes a great increase in the time taken to test the light-emitting devices per unit area. The aforesaid optical signal processing device of the present disclosure uses optical signal testing units to transmit optical signals of micro light-emitting diodes to directly measure multiple micro light-emitting diodes during an instance of a test and thus increase measurement efficiency. The optical signal testing units of the present disclosure use optical fibers to receive optical signals; the dimensions of the optical fiber match the dimensions of the distances between the micro light-emitting diodes, allowing multiple optical fibers to be disposed in the optical signal testing units. The optical fibers correspond in position to the micro light-emitting diodes, respectively; thus, the measurement efficiency increases with the number of the optical fibers. Furthermore, in case of a large light-emitting divergence angle of the micro light-emitting diodes, the optical signal processing device will have to be as close to the micro light-emitting diodes as possible while capturing the optical signals, so as to prevent the optical signal processing device from taking up too much space. Owing to the small dimensions of the optical fibers, the optical signal processing device can stay close to the micro light-emitting diodes to receive the optical signals completely, enhance the precision of measurement, and reduce the volume of the optical signal processing device.

Although the disclosure and advantages thereof are described above, persons skilled in the art understand that various changes, replacements and substitutions may be made to the disclosure without departing from the spirit and scope defined in the appended claims of the disclosure. For instance, the aforesaid processes may be implemented with different methods and replaced with any other processes or a combination thereof.

The scope of the disclosure is not restricted to specific embodiments of any processes, machines, manufacturing, matter compositions, means, methods and steps described herein. The disclosure described herein enables persons skilled in the art to implement the disclosure with any existing or potential processes, machines, manufacturing, matter compositions, means, methods or steps having the same function or capable of achieving substantially the same result as disclosed in the aforesaid embodiments. Therefore, these processes, machines, manufacturing, matter compositions, means, methods or steps fall within the scope of the appended claims of the disclosure.

What is claimed is:

1. An optical signal processing device, for testing optical signals of a micro light-emitting diode array, the micro light-emitting diode array being divided into a plurality of testing blocks each comprising a plurality of micro light-emitting diodes, the optical signal processing device testing the testing blocks one by one, the optical signal processing device comprising:

a plurality of optical signal testing units for:

transmitting a plurality of first optical signals, wherein the first optical signals are generated by a plurality of first micro light-emitting diodes of a selected testing block of the plurality of testing blocks during a first time period; and transmitting a plurality of second optical signals, wherein the second optical signals are generated by a plurality of second micro light-emitting diodes of the selected testing block during a second time period; and an optical signal sensing device for:

sensing the first optical signals transmitted from the optical signal testing units during the first time period;

sensing the second optical signals transmitted from the optical signal testing units during the second time period; and generating a plurality of sensing signals according to the first optical signals and the second optical signals;

wherein the first micro light-emitting diodes and the second micro light-emitting diodes correspond in position to the optical signal testing units, respectively, and each of the optical signal testing units transmits an optical signal generated by the corresponding micro light-emitting diode, the micro light-emitting diodes being in a one-to-one relation with the optical signal testing units;

wherein the first micro light-emitting diodes alternate with the second micro light-emitting diodes; and wherein a position of the optical signal testing units remains unchanged during the first time period and the second time period.

2. The optical signal processing device of claim 1, wherein a sum of a number of the first micro light-emitting diodes and a number of the second micro light-emitting diodes is equal to or less than a number of the optical signal testing units.

3. The optical signal processing device of claim 2, wherein the optical signal testing units each comprises an optical guide unit for transmitting an optical signal generated by the micro light-emitting diode corresponding in position to each of the optical signal testing units.

4. The optical signal processing device of claim 2, wherein the optical signal testing units each further comprises a probe for:

contacting the micro light-emitting diodes; and transmitting a plurality of control signals for controlling the micro light-emitting diodes to generate the optical signals.

5. The optical signal processing device of claim 2, further comprising a plurality of probes for:

contacting the micro light-emitting diodes; and transmitting a plurality of control signals for controlling the micro light-emitting diodes to generate the optical signals.

6. The optical signal processing device of claim 3, further comprising a fiber array block, wherein the fiber array block comprises the optical signal testing units, and the optical guide units each is an optical fiber.

7. The optical signal processing device of claim 3, wherein an optical signal-receiving end of each of the optical guide units comprises a flat surface, a convex surface or a concave surface.

8. The optical signal processing device of claim 3, further comprising an alignment device for aligning the optical guide units with the first micro light-emitting diodes and the second micro light-emitting diodes.

9. The optical signal processing device of claim 8, wherein the alignment device is configured to adjust a distance between each of the optical guide units and the corresponding one of the first micro light-emitting diodes, so as to allow an optical signal reception range of the optical signal-receiving end of each of the optical guide units to cover a divergence range of the first optical signal generated by the corresponding first micro light-emitting diode but not cover a divergence ranges of the first optical signals generated by the neighboring first micro light-emitting diodes.

10. The optical signal processing device of claim 8, wherein the alignment device is further configured to adjust a distance between each of the optical guide units and the corresponding one of the second micro light-emitting diodes, so as to allow an optical signal reception range of the optical signal-receiving end of each of the optical guide units to cover a divergence range of the second optical signal generated by the corresponding second micro light-emitting diode but not cover a divergence ranges of the second optical signals generated by the neighboring second micro light-emitting diodes.

11. The optical signal processing device of claim 1, wherein the optical signal sensing device comprises a camera or a CMOS image sensor.

12. The optical signal processing device of claim 1, wherein the optical signal testing units simultaneously transmit the first optical signals generated by the first micro light-emitting diodes.

13. The optical signal processing device of claim 1, wherein the first micro light-emitting diodes and the second micro light-emitting diodes are RGB light-emitting diodes, and the optical signal testing units receive RGB optical signals generated by the first micro light-emitting diodes during the first time period or RGB optical signals generated by the second micro light-emitting diodes during the second time period.

14. The optical signal processing device of claim 1, wherein the optical signal testing units transmit a plurality of third optical signals generated by a plurality of third micro light-emitting diodes of the selected testing block during a third time period, and the optical signal sensing device senses the third optical signals transmitted from the optical signal testing units during the third time period, wherein the first, second and third micro light-emitting diodes alternate with each other, wherein a position of the optical signal sensing device remains unchanged during the first time period, the second time period and the third time period.

15. The optical signal processing device of claim 14, wherein a sum of a number of the first micro light-emitting diodes, a number of the second micro light-emitting diodes and a number of the third micro light-emitting diodes is equal to or less than a number of the optical signal testing units.

16. An optical signal measurement method for an optical signal processing device, the optical signal measurement method being adapted to test optical signals of a micro light-emitting diode array, the micro light-emitting diode array being divided into a plurality of testing blocks each comprising a plurality of micro light-emitting diodes, allowing the optical signal processing device to test the testing blocks one by one, with the optical signal processing device comprising a plurality of optical signal testing units and an optical signal sensing device, the optical signal measurement method comprising the steps of:

aligning the optical signal testing units with the plurality of micro light-emitting diodes of a selected testing block of the plurality of testing blocks on a wafer, wherein the micro light-emitting diodes comprise a plurality of first micro light-emitting diodes and a plurality of second micro light-emitting diodes;

transmitting, by the optical signal testing units, a plurality of first optical signals generated by the first micro light-emitting diodes during a first time period, wherein each of the optical signal testing units transmits the first optical signal generated by a corresponding one of the first micro light-emitting diodes;

sensing, by the optical signal sensing device, the first optical signals transmitted from the optical signal testing units and generating, by the optical signal sensing device, a plurality of first sensing signals according to the first optical signals;

transmitting, by the optical signal testing units, a plurality of second optical signals generated by the second micro light-emitting diodes during a second time period, wherein each of the optical signal testing units transmits the second optical signal generated by a corresponding one of the second micro light-emitting diodes; and sensing, by the optical signal sensing device, the second optical signals transmitted from the optical signal testing units and generating a plurality of second sensing signals by the optical signal sensing device according to the second optical signals;

wherein the first micro light-emitting diodes and the second micro light-emitting diodes correspond in position to the optical signal testing units, respectively, and each of the optical signal testing units transmits an optical signal generated by the corresponding micro light-emitting diode, the micro light-emitting diodes being in a one-to-one relation with the optical signal testing units;

wherein the first micro light-emitting diodes alternate with the second micro light-emitting diodes; and wherein a position of the optical signal testing units remains unchanged during the first time period and the second time period.

17. The optical signal measurement method of claim 16, wherein the first time period and the second time period do not overlap.

18. The optical signal measurement method of claim 16, wherein the optical signal testing units transmit a plurality of third optical signals generated by a plurality of third micro light-emitting diodes of the selected testing block during a third time period, and the optical signal sensing device senses the third optical signals transmitted from the optical signal testing units during the third time period;

wherein the first, second and third micro light-emitting diodes alternate with each other; and wherein a position of the optical signal sensing device remains unchanged during the first time period, the second time period and the third time period.

19. An optical signal measurement method for an optical signal processing device, the optical signal measurement method being adapted to test optical signals of a micro light-emitting diode array, the micro light-emitting diode array being divided into a plurality of testing blocks each comprising a plurality of micro light-emitting diodes, allowing the optical signal processing device to test the testing blocks one by one, with the optical signal processing device comprising a plurality of optical signal testing units and an optical signal sensing device, the optical signal measurement method comprising the steps of:

aligning the optical signal testing units with a plurality of first micro light-emitting diodes of a selected testing block of the plurality of testing blocks on a wafer;

transmitting, by the optical signal testing units, a plurality of first optical signals generated by the first micro light-emitting diodes during a first time period, wherein each of the optical signal testing units transmits the first optical signal generated by a corresponding one of the first micro light-emitting diodes;

sensing, by the optical signal sensing device, the first optical signals transmitted from the optical signal testing units and generating, by the optical signal sensing device, a plurality of first sensing signals according to the first optical signals;

aligning the optical signal testing units with a plurality of second micro light-emitting diodes of another testing block on the wafer;

transmitting, by the optical signal testing units, a plurality of second optical signals generated by the second micro light-emitting diodes during a second time period, wherein each of the optical signal testing units transmits the second optical signal generated by a corresponding one of the second micro light-emitting diodes; and sensing, by the optical signal sensing device, the second optical signals transmitted from the optical signal testing units and generating a plurality of second sensing signals by the optical signal sensing device according to the second optical signals.

20. The optical signal measurement method of claim 19, wherein the step of aligning the optical signal testing units with the second micro light-emitting diodes on the wafer further comprises moving the wafer to align the optical signal testing units with the second micro light-emitting diodes on the wafer.

* * * * *